US012747897B2

(12) United States Patent
Welch et al.

(10) Patent No.: US 12,747,897 B2
(45) Date of Patent: Sep. 29, 2026

(54) VAPOR-LIQUID SEPARATOR AND SYSTEMS INCLUDING SAME

(71) Applicant: Copeland LP, Sidney, OH (US)

(72) Inventors: Andrew Welch, Franklin, OH (US); Ruben Zelina, Dayton, OH (US)

(73) Assignee: Copeland LP, Sidney, OH (US)

( * ) Notice: Subject to any disclaimer, the term of this patent is extended or adjusted under 35 U.S.C. 154(b) by 126 days.

(21) Appl. No.: 18/933,846

(22) Filed: Oct. 31, 2024

(65) Prior Publication Data

US 2026/0118028 A1 Apr. 30, 2026

(51) Int. Cl.

| | |
|---|---|
| ***F25B 43/00*** | (2006.01) |
| ***B01D 19/00*** | (2006.01) |
| ***B04C 3/00*** | (2006.01) |
| ***B04C 3/06*** | (2006.01) |

(52) U.S. Cl.

CPC .......... *F25B 43/00* (2013.01); *B01D 19/0057* (2013.01); *B04C 3/00* (2013.01); *B04C 3/06* (2013.01); *F25B 2400/0411* (2013.01); *F25B 2400/13* (2013.01); *F25B 2400/23* (2013.01)

(58) Field of Classification Search

CPC .. F25B 43/00; F25B 2400/13; B01D 19/0057; B04C 3/00; B04C 3/06

See application file for complete search history.

(56) References Cited

U.S. PATENT DOCUMENTS

| | | | | |
|---|---|---|---|---|
| 3,590,560 A * | 7/1971 | Pall | B04C 3/00 | 55/396 |
| 4,187,089 A | 2/1980 | Hodgson | | |
| 4,363,641 A * | 12/1982 | Finn, III | B04C 7/00 | 55/460 |
| 4,666,476 A * | 5/1987 | Reeve | B01D 19/0057 | 96/216 |
| 6,322,616 B1 * | 11/2001 | Kennedy | E21B 43/38 | 96/208 |
| 6,389,818 B2 * | 5/2002 | Cho | F25B 43/00 | 62/5 |
| 6,569,323 B1 * | 5/2003 | Pribytkov | B01D 45/12 | 210/512.1 |
| 6,666,041 B1 * | 12/2003 | Agergaard | F25B 43/00 | 62/509 |
| 7,484,374 B2 * | 2/2009 | Pham | F04C 29/042 | 62/81 |
| 7,669,428 B2 * | 3/2010 | Federov | F25B 9/04 | 62/5 |
| 7,846,343 B2 * | 12/2010 | Schook | B01D 21/265 | 55/455 |

(Continued)

*Primary Examiner* — Christopher R Zerphey

(74) *Attorney, Agent, or Firm* — Armstrong Teasdale LLP

(57) ABSTRACT

A vapor-liquid separator includes a first flow path extending between a fluid inlet and a fluid outlet and including a helical portion, a second flow path extending between and fluidly transferring vapor from the first flow path to the vapor outlet and defining a helical portion, and one or more bridges fluidly coupling the first flow path to the second flow. The helical portion of the first flow path causes a reduction in static pressure and an increase in velocity of a fluid flowing through the first flow path and generates a vapor that flows into the second flow path via the one or more bridges. The vapor received within the second flow path is discharged from the vapor outlet and the fluid flowing through the first flow path is discharged from the fluid outlet.

20 Claims, 13 Drawing Sheets

(56) References Cited

U.S. PATENT DOCUMENTS

| | | | | |
|---|---|---|---|---|
| 9,890,977 | B2 * | 2/2018 | Li | F25B 43/00 |
| 10,376,814 | B2 * | 8/2019 | Wikfors | G01N 30/82 |
| 10,828,590 | B2 | 11/2020 | Suzuki et al. | |
| 10,881,996 | B2 | 1/2021 | Suzuki et al. | |
| 11,125,476 | B2 | 9/2021 | Miyawaki et al. | |
| 11,179,662 | B2 | 11/2021 | Suzuki et al. | |
| 12,000,634 | B2 | 6/2024 | Qi et al. | |
| 2009/0139938 | A1 | 6/2009 | Larnholm et al. | |
| 2017/0167767 | A1 | 6/2017 | Shi et al. | |
| 2022/0404078 | A1 | 12/2022 | Yokoyama et al. | |
| 2023/0194136 | A1 | 6/2023 | Kim et al. | |
| 2023/0213251 | A1 | 7/2023 | Dong et al. | |

* cited by examiner

VAPOR-LIQUID SEPARATOR AND SYSTEMS INCLUDING SAME

FIELD

The field of the disclosure relates generally to heating, ventilation, and air conditioning (HVAC) systems, and more particularly, to pressure recovery devices for reversible vapor compression systems.

BACKGROUND

Vapor compression systems are widely used in climate control applications to provide heat pump, refrigeration, and/or air conditioning capabilities. A typical vapor compression system includes a fluid circuit having a first heat exchanger (e.g., a condenser that changes a phase of refrigerant from a gas/vapor phase to a liquid phase), a second heat exchanger (e.g., an evaporator that changes a phase of refrigerant from a liquid phase to a gas/vapor phase), an expansion device disposed between the first and second heat exchangers, and a compressor that operates to circulate and pressurize a gas/vapor phase working fluid (and optional lubricant oil) between the first and second heat exchangers (e.g., the condenser and the evaporator). The compressor is typically a mechanical compressor that serves to pressurize the working fluid, which can be subsequently condensed and evaporated as it is circulated within the system to transfer heat into or out of the system.

The throttling process in the expansion device results in significant energy loss and inefficiencies during the vapor compression cycle. As can be appreciated, if the vapor received by the compressor is at an elevated pressure, less energy is required to fully compress the vapor to the desired discharge pressure. Several devices are typically used to improve compressor efficiency, such as a flash tank or heat plate exchanger, ejector cycles, centrifugal separation or energy recovery pressure exchangers, and two-phase turbines. Vapor injection systems are also used to improve compressor efficiency by supplying intermediate pressure vapor to the compressor. Because the intermediate-pressure vapor is at a somewhat higher pressure than suction pressure and at a somewhat lower pressure than discharge pressure, the work required by the compressor in producing vapor at discharge pressure is reduced.

These expansion energy loss recovery devices can be complex, costly, and are often limited in the amount of vapor that can be separated and delivered to the compressor. As can be appreciated, increased cycle efficiencies necessitate additional expansion energy loss recovery devices, further driving up the complexity and cost of the vapor compression system. Thus, there is a need for an expansion loss recovery device that is less complex, less costly, and more efficient than current expansion energy loss recovery devices.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the disclosure is directed to a vapor-liquid separator including a first flow path, a second flow path, and one or more bridges. The first flow path extends between a fluid inlet and a fluid outlet and defines a helical portion. The helical portion causes a reduction in static pressure and an increase in velocity of a fluid flowing through the first flow path to generate vapor from the fluid. The second flow path extends between and fluidly transfers vapor from the first flow path to a vapor outlet and defines a helical portion. The one or more bridges fluidly couple the first flow path to the second flow path upstream of the vapor outlet and along the helical portion of each of the first flow path and the second flow path. The increased velocity of the fluid flowing through the first flow path causes vapor within the first flow path to flow into the second flow path via the one or more bridges. Vapor received within the second flow path is discharged from the vapor outlet and the fluid flowing through the first flow path is discharged from the fluid outlet.

Another aspect of the disclosure is directed to a vapor-liquid separator including a first flow path and a second flow path. The first flow path includes a fluid inlet section, a fluid outlet section, and a first helical portion extending between and fluidly connecting the fluid inlet section to the fluid outlet section. The fluid inlet section produces an increase in velocity and a decrease in static pressure of a fluid flowing through the fluid inlet section. The fluid outlet section produces a decrease in velocity and an increase in static pressure of a fluid flowing through the fluid outlet section. The first helical portion produces an increase in velocity of the fluid flowing through the first helical portion and separation of a vapor from the fluid. The second fluid flow path includes a vapor outlet section, a second helical portion extending between and fluidly transferring vapor from the first flow path to the vapor outlet section, and one or more bridges fluidly coupling the first helical portion to the second helical portion. The vapor outlet section defines a vapor outlet and produces an increase in static pressure and a decrease in velocity of vapor flowing through the vapor outlet section. The second helical portion is intertwined with the first helical portion and the increased velocity of the fluid flowing through the first helical portion causes vapor within the first helical portion to flow into the second helical portion. The one or more bridges permit vapor within the first helical portion to flow into the second helical portion via the one or more bridges. The vapor received within the second helical portion produces an increase in velocity of the vapor flowing through the second helical portion. The vapor received within the second helical portion is discharged from the vapor outlet and the fluid flowing through the first helical portion is discharged from the fluid outlet.

Another aspect of the disclosure is directed to a system including a fluid compression circuit and a vapor-liquid separator fluidly connected to the fluid compression circuit. The fluid compression circuit includes a compressor operable to compress a refrigerant. The vapor-liquid separator receives liquid refrigerant from the vapor compression circuit and includes a first flow path, a second flow path, and one or more bridges. The first flow path extends between a fluid inlet and a fluid outlet and includes a helical portion causing a reduction in static pressure and an increase in velocity of the liquid refrigerant flowing through the first flow path to generate vapor from the liquid refrigerant. The second flow path extends between and fluidly transfers vapor from the first flow path to the vapor outlet. The one or more bridges fluidly couple the first flow path to the second flow path. The increase velocity of the liquid refrigerant flowing through the first flow path causes vapor within the first flow path to flow into the second flow path via the one or more bridges. Vapor received within the second flow path is discharged from the vapor outlet to an intermediate compression stage of the compressor.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

For conciseness, examples will be described with respect to a reversible vapor compression system operable to heat or cool an interior space. However, other example methods and systems may be used for regulating the temperature of an enclosed space. An efficiency of a reversible vapor compression system can be increased by incorporating a vapor-liquid separator utilizing two helical flow paths fluidly coupled by one or more bridges to generate and deliver more vapor to a compressor than a heat exchanger or a flash tank. The vapor-liquid separator may replace a flash tank and/or a heat exchanger used in a vapor economization loop, reducing complexity and costs of the vapor compressor system.

Figure 1:
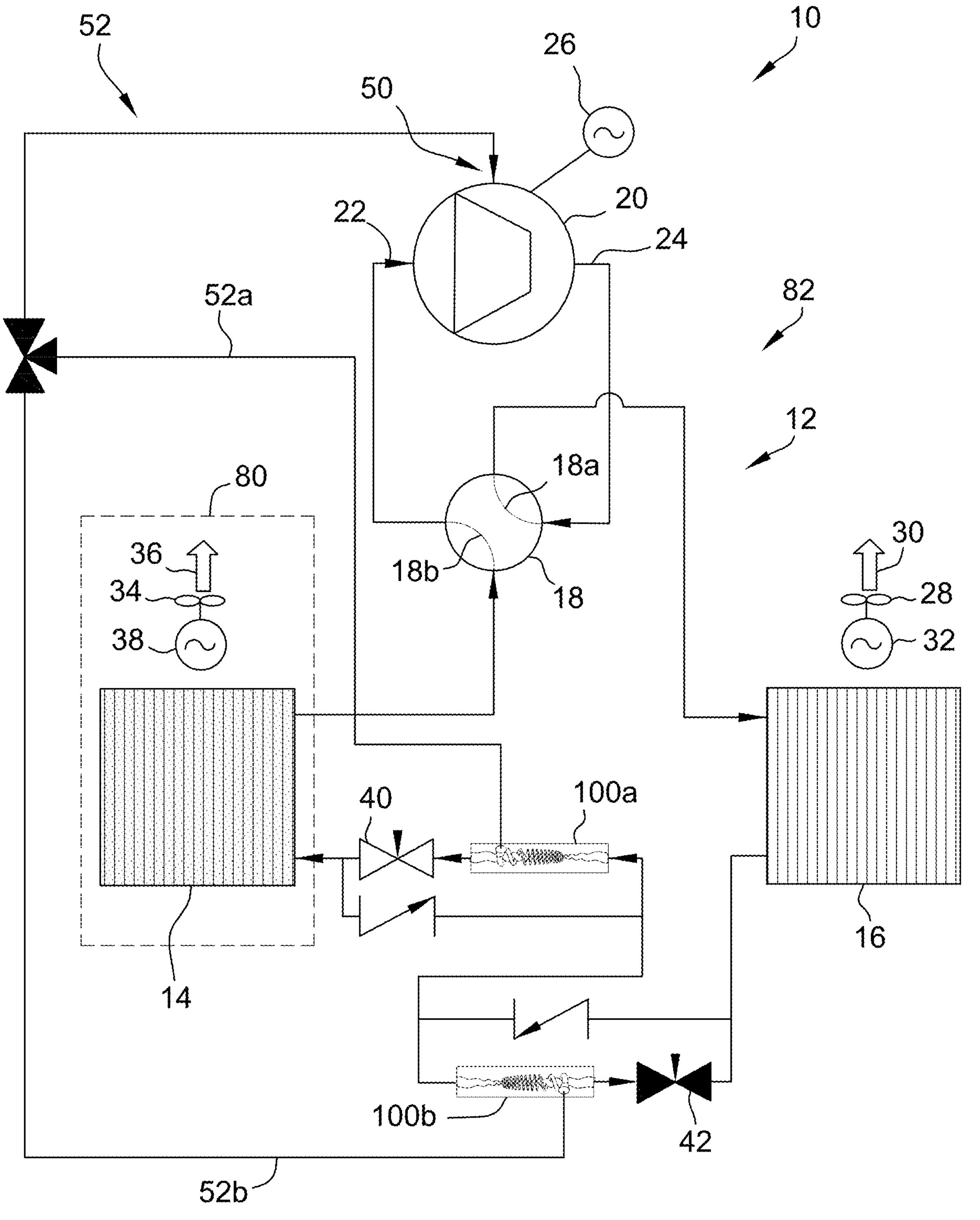
FIG. 1 is a schematic diagram of an example vapor compression system, showing the vapor compression system in a cooling mode.
Figure 2A:
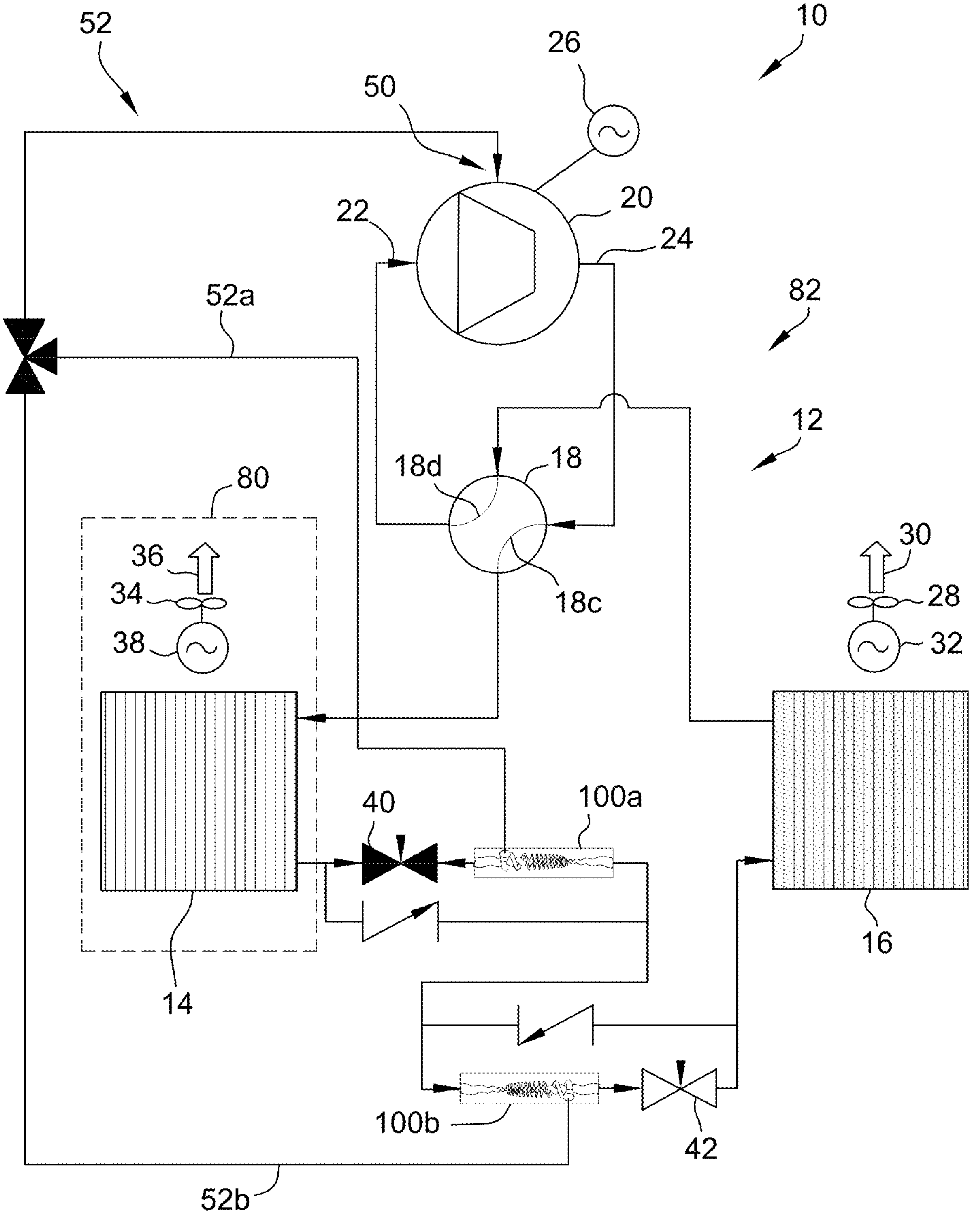
FIG. 2A is a schematic diagram of the vapor compression system of FIG. 1, showing the vapor compression system in a heating mode.

Referring to FIGS. 1 and 2A, schematic diagrams of an example vapor compression system for cooling or heating an interior space surrounded by an exterior space is illustrated and generally identified by reference numeral 10. It is envisioned that the vapor compression system 10 may be implemented as part of a heating, ventilation, and air conditioning (HVAC) system, a refrigeration system, and/or a heat pump without departing from the scope of the disclosure. The vapor compression system 10 includes a single, reversible, closed refrigerant loop 12 that includes an indoor heat exchanger 14, an outdoor heat exchanger 16, a multiway or reversing valve 18, a compressor 20, a first expansion device 40, a second expansion device 42, a first vapor-liquid separator 100*a*, and a second vapor-liquid separator 100*b*. In other embodiments, the vapor compression system 10 may include multiple refrigerant loops to accommodate multiple compressors, or may operate in parallel with another system, such as a humidity control system. As described in further detail herein, the multiway valve is selectively positionable to selectively alter a direction of flow of the refrigerant through the vapor compression system 10, and thus, whether the vapor compression system 10 operates to cool or heat the interior space 80.

FIG. 1 illustrates the vapor compression system 10 with the multiway valve 18 disposed in a first position for operating in a cooling mode. In the cooling mode, the refrigerant enters the compressor 20 at a compressor inlet 22 as a low-pressure, low-temperature gas (e.g., a suction flow). The compressor 20 increases the pressure of the refrigerant, which exits the compressor 20 at a compressor outlet 24 as a high-pressure, high-temperature gas (e.g., a discharge flow). It is envisioned that the compressor 20 may be driven by any suitable motor, and in embodiments, may be driven by a variable frequency drive (VFD) 26.

The discharge flow passes through a first discharge path 18*a* of the multiway valve 18, which directs the refrigerant to the outdoor heat exchanger 16. The outdoor heat exchanger 16 functions as a condenser, removing heat $Q_{out}$ from the refrigerant and releasing the heat into an exterior space 82 to convert the refrigerant gas into a high-pressure, high-temperature liquid. A first fan 28 produces a first airflow 30 from the outdoor heat exchanger 16 toward the exterior space 82 to exhaust warm air toward the exterior space 82. It is contemplated that the first fan 28 may be driven by any suitable motor, and in embodiments, may be driven by a second VFD 32.

Downstream of the outdoor heat exchanger 16, the refrigerant bypasses the second vapor-liquid separator 100*b* and the second expansion device 42 and flows through the first vapor-liquid separator 100*a*, which partially expands the liquid refrigerant, and then the first expansion device 40, which reduces the total pressure and further expands the refrigerant. In some embodiments, the static pressure may be reduced until the liquid refrigerant's current temperature becomes the boiling temperature at that pressure, and the refrigerant becomes a two-phase mixture as some of the liquid refrigerant boils and turns into a gas. The first expansion device 40 may be a fixed orifice, a thermal expansion valve, an electronic expansion valve, or another type of expansion device that allows the vapor compression system 10 to function as described.

The first vapor-liquid separator 100*a* is fluidly connected to the indoor heat exchanger 14, which receives liquid refrigerant or a two-phase mixture of liquid and gaseous refrigerant at its inlet. As described in further detail herein, the first vapor-liquid separator 100*a* causes the fluid (e.g., saturated or at least partially sub-cooled liquid) to accelerate, causing vapor within the fluid to separate. The vapor is channeled through a divergent portion of a first flow path of the first vapor-liquid separator 100*a* to convert the velocity of the vapor into pressure, which is discharged from a vapor outlet and delivered to a vapor injection port 50 of an intermediate pressure section of the compressor 20 by way of the flow paths 52*a* and 52. The liquid separated from the vapor is channeled through a divergent portion of a second flow path of the first vapor-liquid separator 100*a* to convert the velocity of the liquid into pressure, which is discharged from a fluid outlet and delivered to the first expansion device 40.

The expanded liquid refrigerant is channeled from the first expansion device 40 to the indoor heat exchanger 14. The indoor heat exchanger 14 functions as an evaporator, with the refrigerant absorbing heat $Q_{in}$ from the interior space 80 to change the phase of the refrigerant from liquid to gas. A second fan 34 produces a second airflow 36 across the indoor heat exchanger 14 toward the interior space 80, thereby cooling the interior space 80. It is envisioned that the second fan 34 may be driven by any suitable motor, and in embodiments, may be driven by a third VFD 38. The gaseous refrigerant flow then passes through a first suction path 18*b* of the multiway valve 18 and is returned to the compressor inlet 22 as a suction flow.

With reference to FIG. 2A, the vapor compression system 10 is illustrated with the multiway valve 18 disposed in a second position for operating in a heating mode. Similar to the cooling mode, refrigerant enters the compressor 20 at the compressor inlet 22 as a low-pressure, low-temperature gas (e.g., a suction flow). The compressor 20 increases the total pressure of the refrigerant, which exits the compressor 20 at the compressor outlet 24 as a high-pressure, high-temperature gas (e.g., a discharge flow). The discharge flow passes through a second discharge path 18*c* of the multiway valve 18, which directs the refrigerant to the indoor heat exchanger 14. The indoor heat exchanger 14 functions as a condenser, removing heat $Q_{out}$ from the refrigerant to convert the refrigerant gas into a high-pressure, high-temperature liquid. The second fan 34 produces the second airflow 36 across the indoor heat exchanger 14 toward the interior space 80, thereby releasing heat $Q_{out}$ into the interior space 80.

Downstream of the indoor heat exchanger 14, the refrigerant bypasses the first vapor-liquid separator 100*a* and flows through the second vapor-liquid separator 100*b*, which reduces the static pressure of the refrigerant. The static pressure may be reduced until the liquid refrigerant's current temperature becomes the boiling point temperature at that pressure, and the refrigerant becomes a two-phase mixture as some of the liquid refrigerant boils and turns into a gas.

The second vapor-liquid separator 100*b* is fluidly connected to the outdoor heat exchanger 16, which receives liquid refrigerant or a two-phase mixture of liquid and gaseous refrigerant at its inlet. The outdoor heat exchanger 16 functions as an evaporator, with the refrigerant absorbing heat $Q_{in}$ from the exterior space 82 and changing phase from a liquid to a gas. The first fan 28 produces the first airflow 30 from the outdoor heat exchanger 16 toward the exterior space 82. The gaseous refrigerant flow then passes through a second suction path 18*d* of the multiway valve 18 and is returned to the compressor inlet 22 as a suction flow.

Figure 2B:
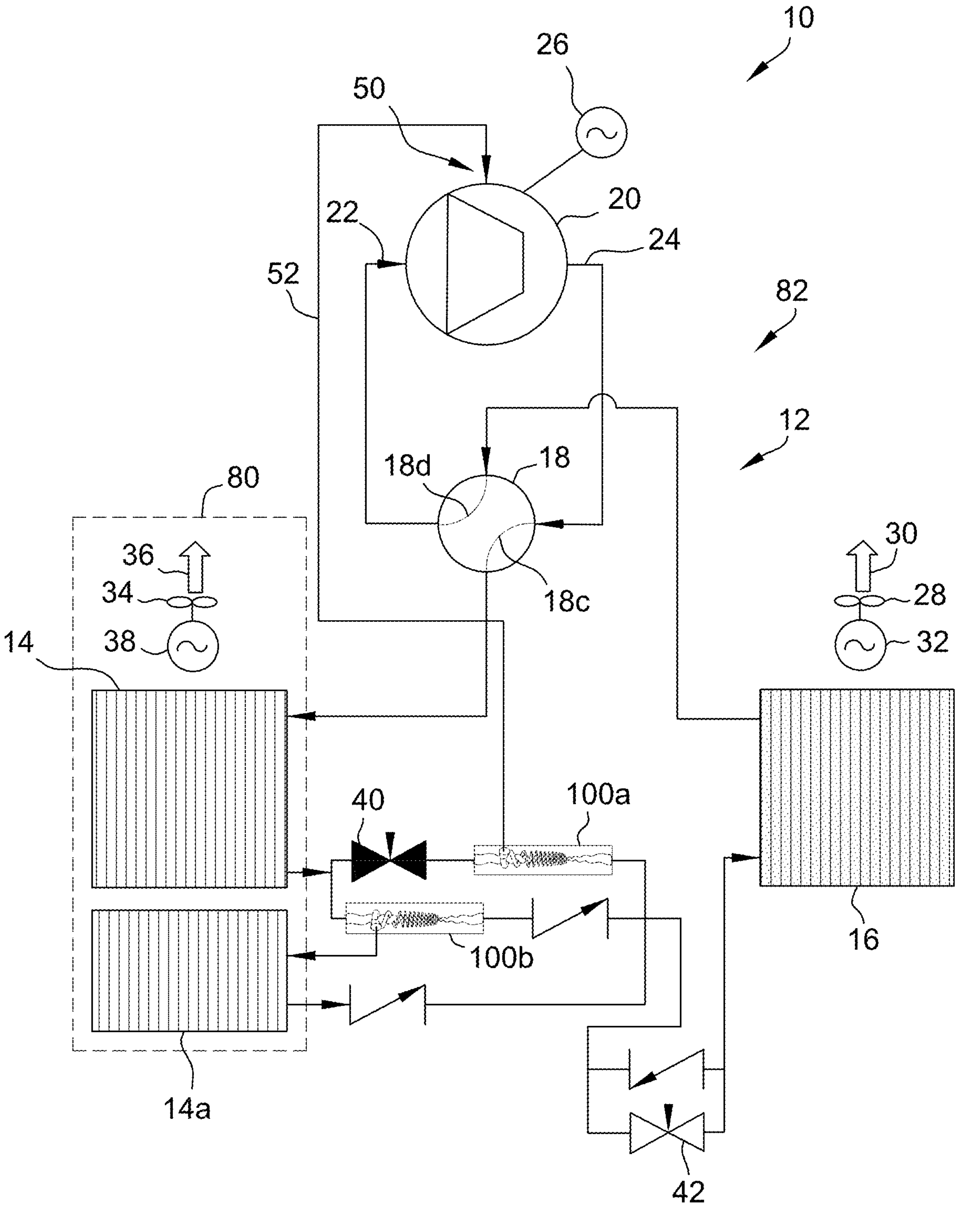
FIG. 2B is a schematic diagram of another embodiment of the vapor compression system of FIG. 1 including a second indoor heat exchanger.

With additional reference to FIG. 2B, it is envisioned that the vapor compression system 10 may include a second indoor heat exchanger 14*a* fluidly coupled to the second vapor-liquid separator 100*b*. The second indoor heat exchanger 14*a* receives vapor or refrigerant gas from the second vapor-liquid separator 100*b* to perform a first stage of heating before being returned to rejoin the flow from the fluid outlet. As can be appreciated, utilizing the vapor from the second vapor-liquid separator 100*b* flowing through the second indoor heat exchanger 14*a* may perform the first stage of heating without injecting vapor into the compressor 20, and may increase both the efficiency of the vapor compression system 10 and the capacity of the compressor 20 compared to vapor compression systems without the second indoor heat exchanger 14*a*.

Figure 3:
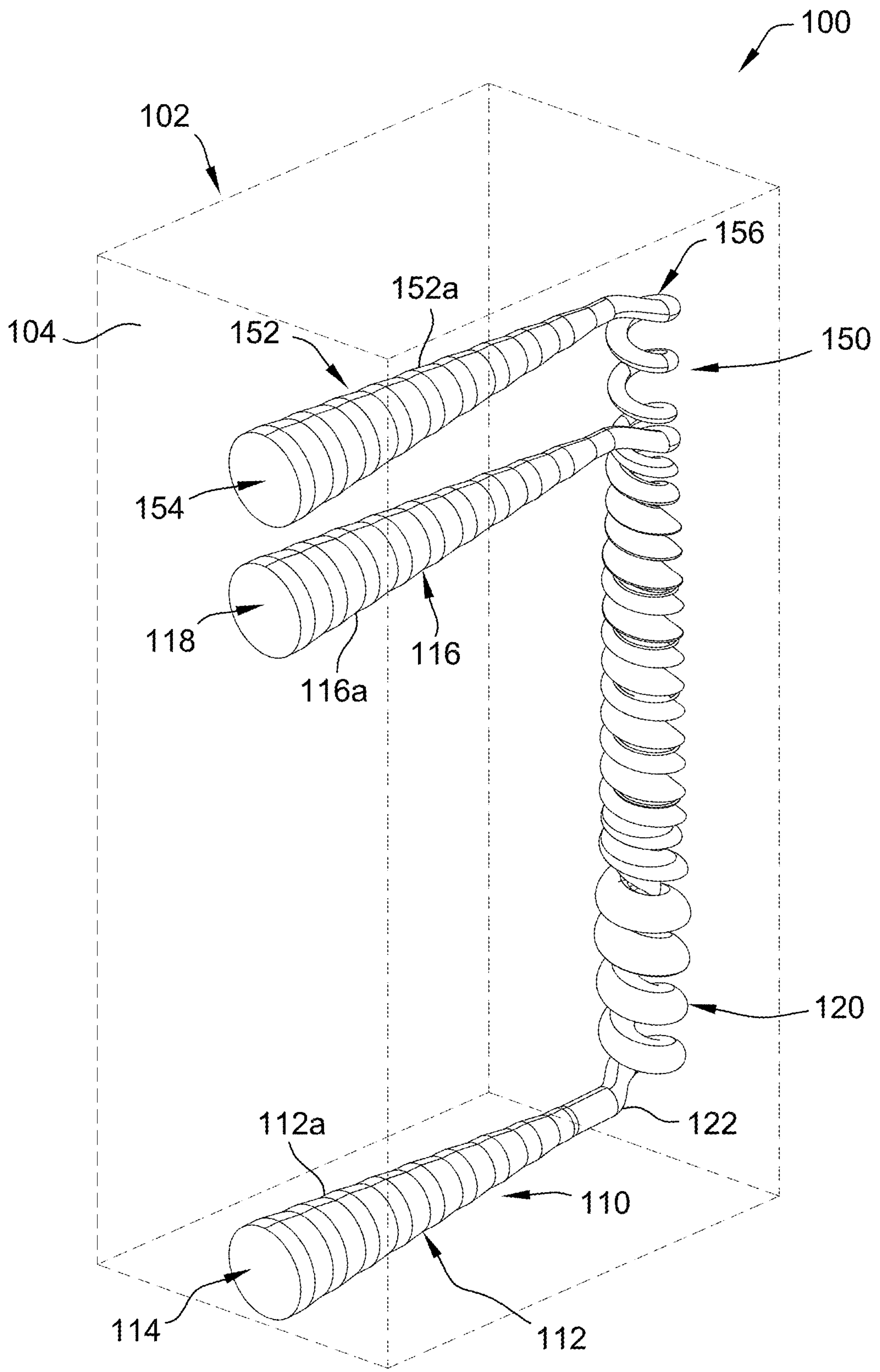
FIG. 3 is a perspective view of an example vapor-liquid separator suitable for use in the vapor compression systems of FIGS. 1-2B.
Figure 4:
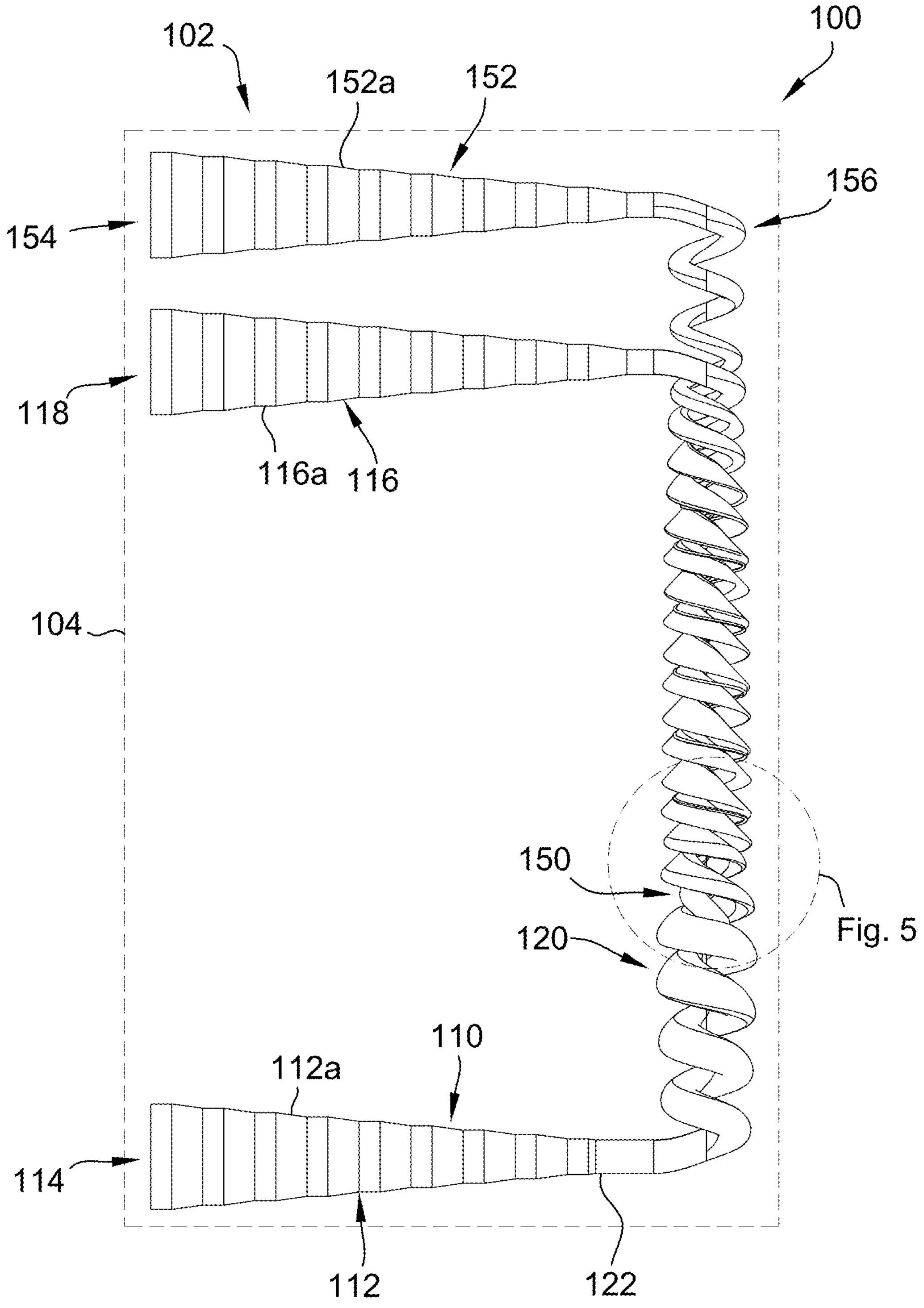
FIG. 4 is a side, elevation view of the vapor-liquid separator of FIG. 3.
Figure 5:
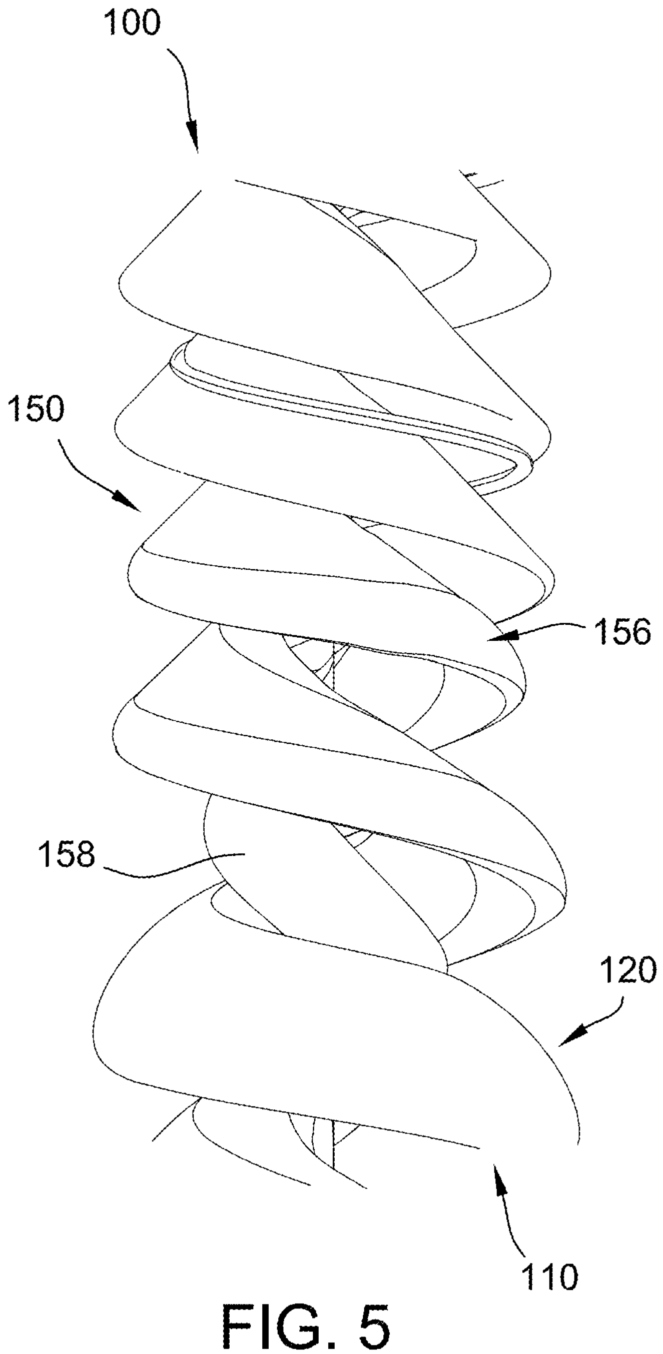
FIG. 5 is an enlarged view of the area of detail indicated in FIG. 4.
Figure 6:
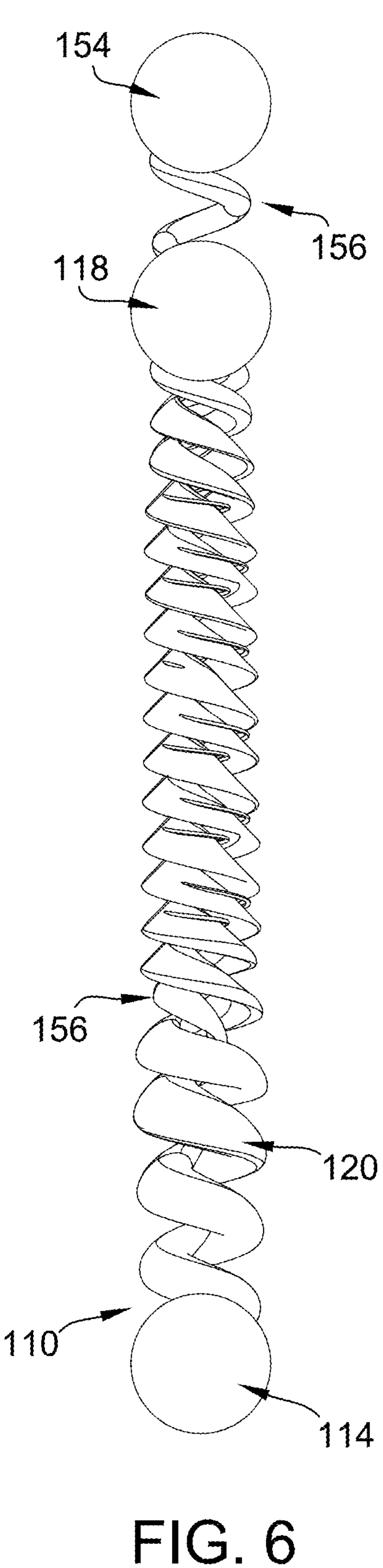
FIG. 6 is a front, elevation view of the vapor-liquid separator of FIG. 3.

Referring back to FIGS. 1 and 2A, the compressor 20 of the vapor compression system 10 includes a vapor injection port 50 operably coupled to a vapor injection conduit 52. The vapor injection conduit 52 is fluidly coupled to the vapor outlet 154 (FIG. 3) of the first vapor-liquid separator 100*a* via a first vapor injection conduit 52*a* and is fluidly coupled to the vapor outlet 154 of the second vapor-liquid separator 100*b* via a second vapor injection conduit 52*b*. As will be appreciated, the vapor-liquid separators 100*a*, 100*b* output a greater amount of vapor as compared to an economizer loop having a flash tank and/or a separate heat exchanger. In this manner, it is envisioned that the vapor-liquid separators 100*a*, 100*b* may replace or otherwise obviate the need for a flash tank and/or separate heat exchanger when generating and delivering vapor to the vapor injection port 50 of the compressor 20.

As will be appreciated, the geometry and efficiency of the vapor-liquid separator 100*a* enables the vapor-liquid separator 100*a* to be miniaturized or otherwise reduced in size as compared to a flash tank or other energy recovery devices typically utilized in vapor injection cycles. It is contemplated that vapor-liquid separator 100*a* may be manufactured or otherwise formed using any suitable method. In embodiments, the vapor-liquid separator 100*a* may be formed using additive manufacturing, reductive manufacturing, etc., and combinations thereof. It is envisioned that the vapor-liquid separator 100*a* may be formed by casting using a wax and/or phase change material, 3D printing, investment casting, etc. It is envisioned that the vapor-liquid separator 100*a* may be formed wholly or in part by 3D printing. It is contemplated that 3D printing may be utilized to manage pressure boundaries and other important boundaries, and in embodiments may utilize copper to manage the pressure and/or other important boundaries.

Referring to FIGS. 3-9, a first example vapor-liquid separator is 100 is illustrated. In the example embodiment, each of the vapor-liquid separators 100*a*, 100*b* are substantially similar and therefore, only one vapor-liquid separator 100 will be described herein in the interest of brevity.

The vapor-liquid separator 100 includes a housing 102 within which a first flow path 110 and a second flow path 150 are defined. Although generally illustrated as having a rectangular configuration, it is envisioned that the housing 102 may have any suitable shape and/or configuration that enables the vapor-liquid separator 100 to function as described herein. In some embodiments, the housing 102 may have a shape or configuration that is complementary to the configuration of the first flow path 110 and the second flow path 150. The first flow path 110 defines a fluid inlet converging section 112 defining a fluid inlet 114 extending through an outer surface 104 of the housing 102. The fluid inlet 114 is fluidly coupled to the refrigeration loop 12 (FIGS. 1 and 2A) and receives fluid (e.g., saturated or at least partially sub-cooled liquid). The fluid inlet converging section 112 defines a generally frusto-conical profile having an inner dimension that decreases in a direction extending away from the fluid inlet 114. In this manner, the frusto-conical profile causes an increase in velocity and a decrease in static pressure of liquid refrigerant flowing through the fluid inlet converging section 112. In embodiments, an inner surface 112*a* of the fluid inlet converging section 112 may define a stepped cone profile, having generally linear portions separated by frusto-conical portions. The stepped cone profile of the inner surface 112*a* can interrupt potential eddy current loops of the fluid flowing through the fluid inlet converging section 112, minimizing or otherwise mitigating the formation of eddy currents along the inner surface 112*a* of the fluid inlet converging section 112.

The first flow path 110 defines a fluid outlet diverging section 116 defining a fluid outlet 118 extending through the outer surface 104 of the housing 102. The fluid outlet 118 is fluidly coupled to the refrigeration loop 12 (FIGS. 1 and 2A) and exhausts or otherwise discharges liquid or two-phase refrigerant from the vapor-liquid separator 100 back into the refrigeration loop 12. The fluid outlet diverging section 116 defines a generally frusto-conical profile having an inner dimension that increases in a direction extending toward the fluid outlet 118. In this manner, the frusto-conical profile causes a decrease in velocity and an increase in static pressure of liquid refrigerant flowing through the fluid outlet diverging section 116. In embodiments, an inner surface 116*a* of the fluid outlet diverging section 116 may define a stepped cone profile, having generally linear portions separated by frusto-conical portions. Although generally illustrated as having a profile that is generally complimentary to the profile of the fluid inlet converging section 112, it is envisioned that the fluid outlet diverging section 116 may include any suitable profile, which may be the same or different than the profile of the fluid inlet converging section 112.

Continuing with FIGS. 3-9, the first flow path 110 defines a first helical portion 120 extending between and fluidly connecting the fluid inlet converging section 112 to the fluid outlet diverging section 116. The first helical portion 120 defines a throat 122 including a cross-sectional area that is less than or equal to a cross-sectional area of a portion of the first helical portion 120 adjacent to the fluid inlet converging section 112, although it is envisioned that the throat may define any cross-sectional area, which is smaller than or larger than the cross-sectional area of the first helical portion 120 and/or the first inlet converging section 112 adjacent to the throat 122. In this manner, the throat 122 is fluidly coupled and/or receives liquid or two-phase refrigerant from the fluid inlet converging section 112. The throat 122 cooperates with the helical profile of the first helical portion 120 to produce an increase in velocity of the fluid flowing through the first helical portion 120 and separation of a vapor from the fluid. In some embodiments, the liquid flowing through the throat 122 and the first helical portion 120 can be accelerated to about the speed of sound of the fluid for the state of the fluid flowing through the first helical portion 120 (e.g., temperature, pressure, etc.).

In some embodiments, the profile of the first helical portion 120 defines a generally circular cross-section adjacent to the fluid inlet converging section 112, transitions to a generally non-circular cross-section, such as curvilinear, ovoid, etc., in a direction extending away from the fluid inlet converging section 112, and transitions back to a circular cross-section adjacent to the fluid outlet diverging section 116, although it is envisioned that the first flow path 110 and/or the first helical portion 120 may define any suitable cross-section at any portion along its length without departing from the scope of the disclosure. As can be appreciated, the slope or non-circular profile of the first helical portion 120 minimizes or otherwise mitigates a difference in velocity between vapor and liquid refrigerant flowing through the first helical portion 120.

The second flow path 150 defines a vapor outlet diverging section 152 defining a vapor outlet 154 extending through the outer surface 104 of the housing 102. The vapor outlet 154 is fluidly coupled to the refrigeration loop 12 and exhausts or otherwise discharges vapor and/or gaseous refrigerant from the vapor-liquid separator 100 to the vapor injection port 50 via the vapor injection conduit 52 (FIGS. 1 and 2A). The vapor outlet diverging section 152 defines a generally frusto-conical profile having an inner dimension that increases in a direction extending toward the vapor outlet 154. In this manner, the frusto-conical profile causes a decrease in velocity and an increase in static pressure of vapor flowing through the vapor outlet diverging section 152. In some embodiments, an inner surface 152*a* of the vapor outlet diverging section 152 may define a stepped cone profile, having generally linear portions separated by frusto-conical portions. Although generally illustrated as having a profile that is generally complimentary to the profile of the fluid inlet converging section 112 and/or the fluid outlet diverging section 116, it is envisioned that the vapor outlet diverging section 152 may include any suitable profile, which may be the same or different than the profile of the fluid inlet converging section 112 and/or the fluid outlet diverging section 116.

The second flow path 150 defines a second helical portion 156 extending between and transferring vapor from the first flow path 110 to the vapor outlet diverging section 152. In embodiments, the second helical portion 156 may extend between a vapor inlet 158 (FIG. 5) and the vapor outlet diverging section 152. As described in further detail herein, the increased velocity of the liquid refrigerant flowing through the first flow path 110 causes vapor to develop within the liquid refrigerant. The increasing velocity of the liquid refrigerant generates or otherwise causes a buoyant force to separate the vapor within the liquid refrigerant and causes the separated vapor to flow into (e.g., radially inward) the vapor inlet 158 and the second helical portion 156. In embodiments, the second helical portion 156 is interdigitated or otherwise intertwined with the first helical portion 120. In this manner, the first helical portion 120 and the second helical portion 156 may be disposed in a stacked or alternating manner in a direction extending between the fluid inlet 114 and each of the fluid outlet 118 and vapor outlet 154. As described in further detail herein, the increased velocity of the fluid flowing through the first helical portion 120 causes vapor within the first helical portion 120 to flow into the second helical portion 156.

In some embodiments, the profile of the second helical portion 156 may have a generally circular cross-section adjacent to the vapor inlet 158, transition to a generally non-circular cross-section in a direction extending away from the vapor inlet 158, and transitions back to a circular cross-section adjacent to the vapor outlet diverging section 152, although it is envisioned that the second flow path 150 and/or the second helical portion 156 may define any suitable cross-section at any portion along its length, which may be the same or different than the profile of the first flow path 110.

As can be appreciated, the number of turns or coils of the first helical portion 120 and the second helical portion 156 influences or otherwise impacts the velocity and/or pressure of the liquid refrigerant and vapor flowing through each of the first and second helical portions 120, 156. Additionally, as described hereinabove, the profile or cross-section of the first and second helical portions 120, 156 influences or otherwise impacts the velocity of each of the vapor and liquid refrigerant flowing through the first and second helical portions 120, 156. In this manner, the non-circular cross-section of the first helical portion 120 minimizes or otherwise mitigates a difference in velocity between vapor and liquid refrigerant flowing through the first helical portion 120 and inhibits or otherwise minimizes remixing of the vapor and liquid. The non-circular cross-section of the second helical portion 156 causes similar effects to the non-circular cross-section of the first helical portion. It is envisioned that the profile of each of the first and second helical portions 120, 156 may be variable along their length, and may be scaled depending upon the liquid refrigerant utilized in the vapor compression system 10. In this manner, the geometry of the first and second helical portions 120, 156 may be proportional or otherwise based upon a ratio of vapor and liquid flowing through the first and second helical portions 120, 156. As can be appreciated, the density of the refrigerant may drive or otherwise influence the size of the vapor-liquid separator 100.

Figure 7:
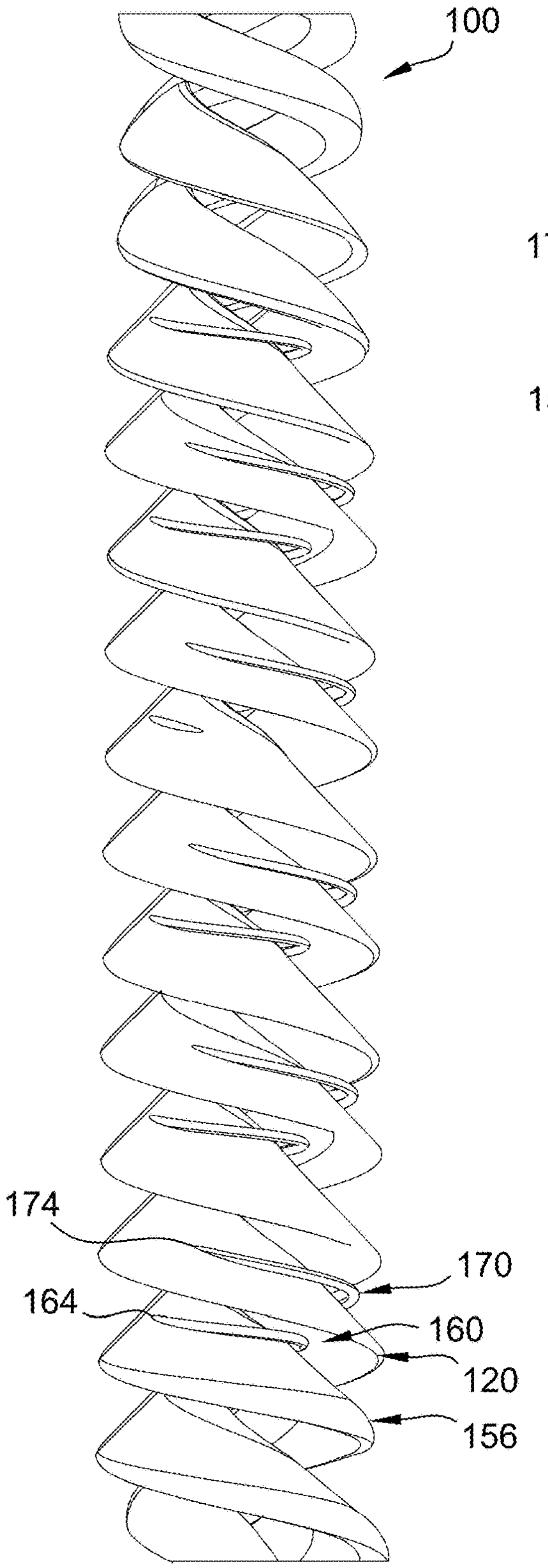
FIG. 7 is a side, elevation view of a helical portion of a first flow path and a helical portion of a second flow path of the vapor-liquid separator of FIG. 3.
Figure 8:
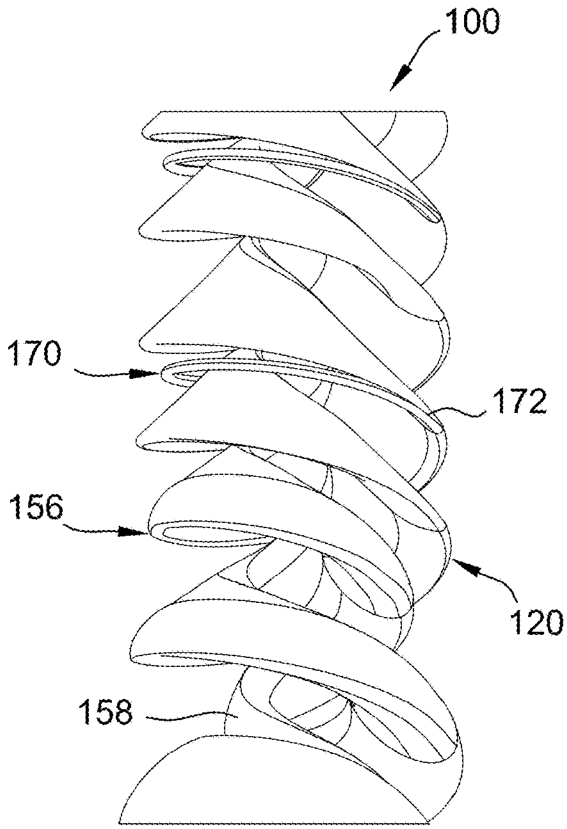
FIG. 8 is an enlarged view of the helical portions of the first and second flow paths of the vapor-liquid separator of FIG. 3, illustrating liquid bridges coupling the first helical portion to the second helical portion.
Figure 9:
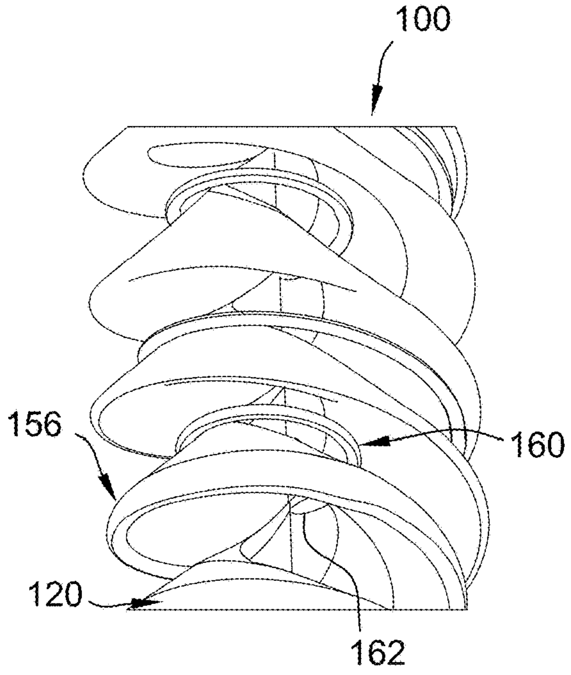
FIG. 9 is an enlarged, perspective view of the helical portions of the first and second flow paths of the vapor-liquid separator of FIG. 3, illustrating vapor bridges coupling the first helical portion to the second helical portion.

With reference to FIGS. 7-9, the vapor-liquid separator 100 includes one or more vapor or first bridges 160 fluidly coupling the first helical portion 120 to the second helical portion 156 upstream of the fluid outlet 118. The one or more first bridges 160 channel or otherwise permit vapor within the first helical portion 120 to flow into the second helical portion 156 and produce an increase in velocity of the vapor flowing through the second helical portion 156. Although generally illustrated as discrete tubular passages, it is envisioned that the one or more first bridges 160 may include any suitable profile and each bridge of the one or more first bridges 160 may include the same or different profile.

The one or more first bridges 160 define a vapor inlet 162 fluidly coupled to the first flow path 110 along a radial inner side of the first helical portion 120 and a vapor outlet 164 fluidly coupled to the second flow path 150 along a radial outer side or a region where liquid is collected of the second helical portion 156. In this manner, the one or more first bridges 160 extend between the first helical portion 120 and the second helical portion 156, although it is envisioned that the one or more first bridges 160 may extend in any manner relative to the first helical portion 120 and/or the second helical portion 156. In one non-limiting embodiment, the one or more first bridges 160 extend helically about the first helical portion 120. It is envisioned that the one or more first bridges 160 may be disposed on any coil of each of the first helical portion 120 and the second helical portion 156 without departing from the scope of the disclosure. In one non-limiting embodiment, the first and second helical portions 120, 156 includes a first bridges 160 once per revolution to minimize or otherwise inhibit overlapping the first and second flow paths 110, 150.

It is contemplated that the vapor outlet 164 of the one or more first bridges 160 may be fluidly coupled to the second hollow interior portion downstream of the vapor inlet 162 where the static pressure of the vapor flowing through the second flow path 150 is lower than the static pressure of the vapor flowing through the second flow path 150 upstream of the vapor inlet 162. As can be appreciated, by locating the vapor outlet 164 downstream of the vapor inlet 162 promotes or otherwise increases an amount of vapor flowing through the one or more first bridges to the second flow path 150. In embodiments, the vapor inlet 162 is fluidly coupled to the first flow path 110 along a radial inner side of the first helical portion 120 and a vapor outlet 164 fluidly coupled to the second flow path 150 along a radial outer side of the second helical portion 156.

In some embodiments, the vapor-liquid separator 100 includes one or more liquid or two-phase or second bridges 170 fluidly coupling the first helical portion 120 to the second helical portion 156 upstream of the fluid outlet 118. The one or more second bridges 170 channel or otherwise permit liquid refrigerant within the second helical portion 156 to flow into the first helical portion 120. Although generally illustrated as discrete tubular passages, it is envisioned that the one or more second bridges 170 may include any suitable profile and each bridge of the one or more second bridges 170 may include the same or different profile from one another or from the one or more first bridges 160 without departing from the disclosure. The one or more second bridges 170 define a liquid inlet 172 fluidly coupled to the second flow path 150 along a radial outer side of the second helical portion 156 and a liquid outlet 174 fluidly coupled to the first flow path 110 along the first helical portion 120. In this manner, the one or more second bridges 170 extend between the first helical portion 120 and the second helical portion 156, although it is envisioned that the one or more second bridges 170 may extend in any manner relative to the first helical portion 120 and/or the second helical portion 156. In one non-limiting embodiment, the one or more second bridges 170 extending helically about the first helical portion 120. It is envisioned that the one or more second bridges 170 may be disposed on any coil of each of the first helical portion 120 and the second helical portion 156. In one non-limiting embodiment, the first and second helical portions 120, 156 include a second bridge 170 once per revolution to minimize or otherwise inhibit overlapping the first and second flow paths 110, 150.

With reference to FIGS. 3-9, in operation, the fluid inlet 114 of the vapor-liquid separator 100 receives a fluid, which in embodiments, is liquid refrigerant (e.g., saturated or at least partially sub-cooled liquid). The liquid refrigerant received by the fluid inlet 114 flows through the fluid inlet converging section 112, causing an increase in velocity and a decrease in static pressure of the liquid refrigerant. The liquid refrigerant is received by the first helical portion 120, where the throat 122 cooperates with the helical profile of the first helical portion 120 to produce an increase in velocity of the liquid refrigerant, which develops vapor within the liquid refrigerant. The increasing velocity of the liquid refrigerant generates or otherwise causes a buoyant force to separate the vapor within the liquid refrigerant and causes the separated vapor to flow towards a radially inner portion of the first helical portion 120. The separated vapor flows through the one or more first bridges 160 and into the second helical portion 156 of the second flow path 150.

As can be appreciated, the vapor continues to be separated from the liquid refrigerant and flow through the one or more first bridges 160 as the liquid refrigerant flows through the first helical portion 120 towards the fluid outlet diverging section 116. The vapor received within the second helical portion 156 produces an increase in velocity of the vapor flowing through the second helical portion 156 to about the speed of sound of for the state of the vapor (e.g., temperature, pressure, etc.). Any liquid that is present within the second helical portion 156 flows towards the radial outer portion of the second helical portion 156 and is channeled through the one or more second bridges 170 into the first helical portion 120. The vapor flowing through the second helical portion 156 is received by the vapor outlet diverging section 152, where the diverging frusto-conical profile of the vapor outlet diverging section 152 causes a decrease in velocity and an increase in static pressure of the vapor. The vapor is discharged from the vapor outlet 154, where it is channeled through the first vapor injection conduit 52*a* to the vapor injection port 50 of the compressor 20.

The increased velocity of the liquid refrigerant flowing through the first helical portion 120 continues to develop and separate vapor within the liquid refrigerant. The additional vapor separated from the liquid refrigerant flowing through the first helical portion 120 flows towards the radially inner side of the first helical portion 120 and into the second helical portion 156 via the one or more first bridges 160. The liquid refrigerant flowing through the first helical portion 120 flows into the fluid outlet diverging section 116, where the diverging frusto-conical profile of the fluid outlet diverging section 116 causes a decrease in velocity and an increase in static pressure of the liquid refrigerant. The liquid refrigerant is discharged from the fluid outlet 118, where it is channeled to the first expansion device 40.

Figure 10:
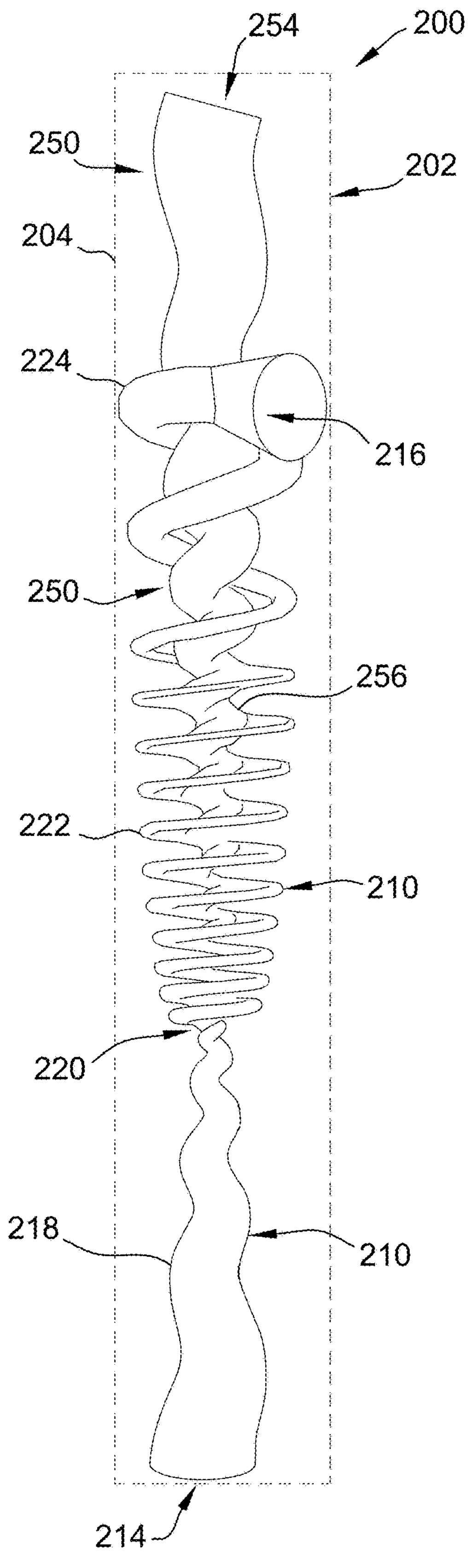
FIG. 10 is an elevation view of another embodiment of a vapor-liquid separator suitable for use in the vapor compression systems of FIGS. 1-2B.
Figure 11:
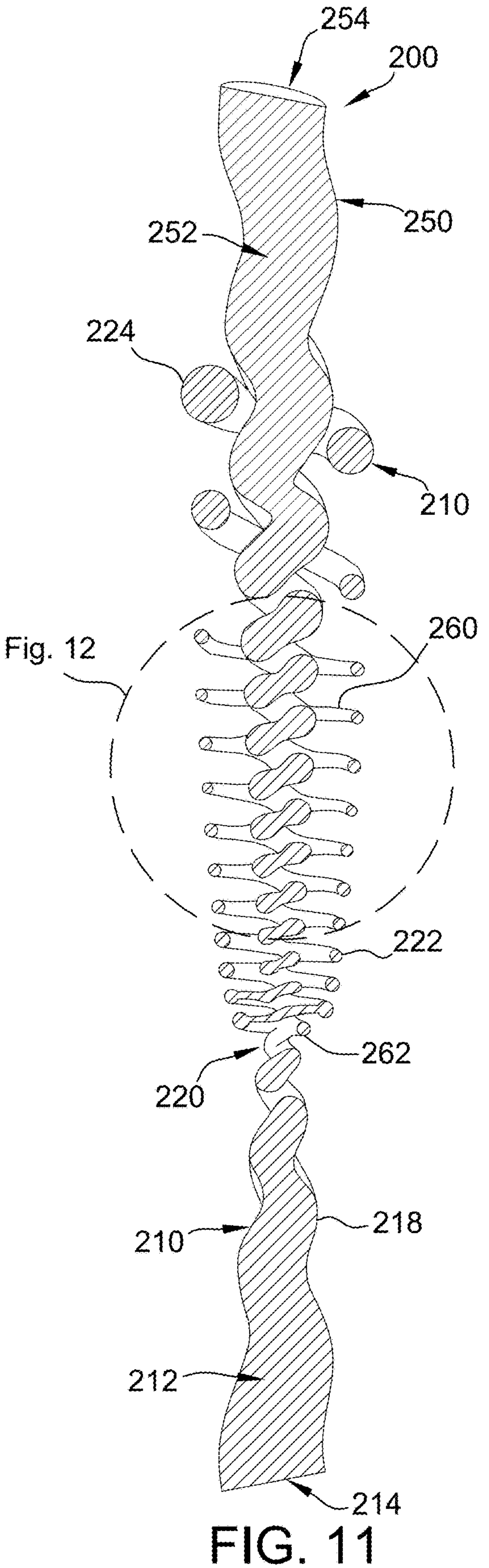
FIG. 11 is a cross-sectional view of the vapor-liquid separator of FIG. 10.
Figure 12:
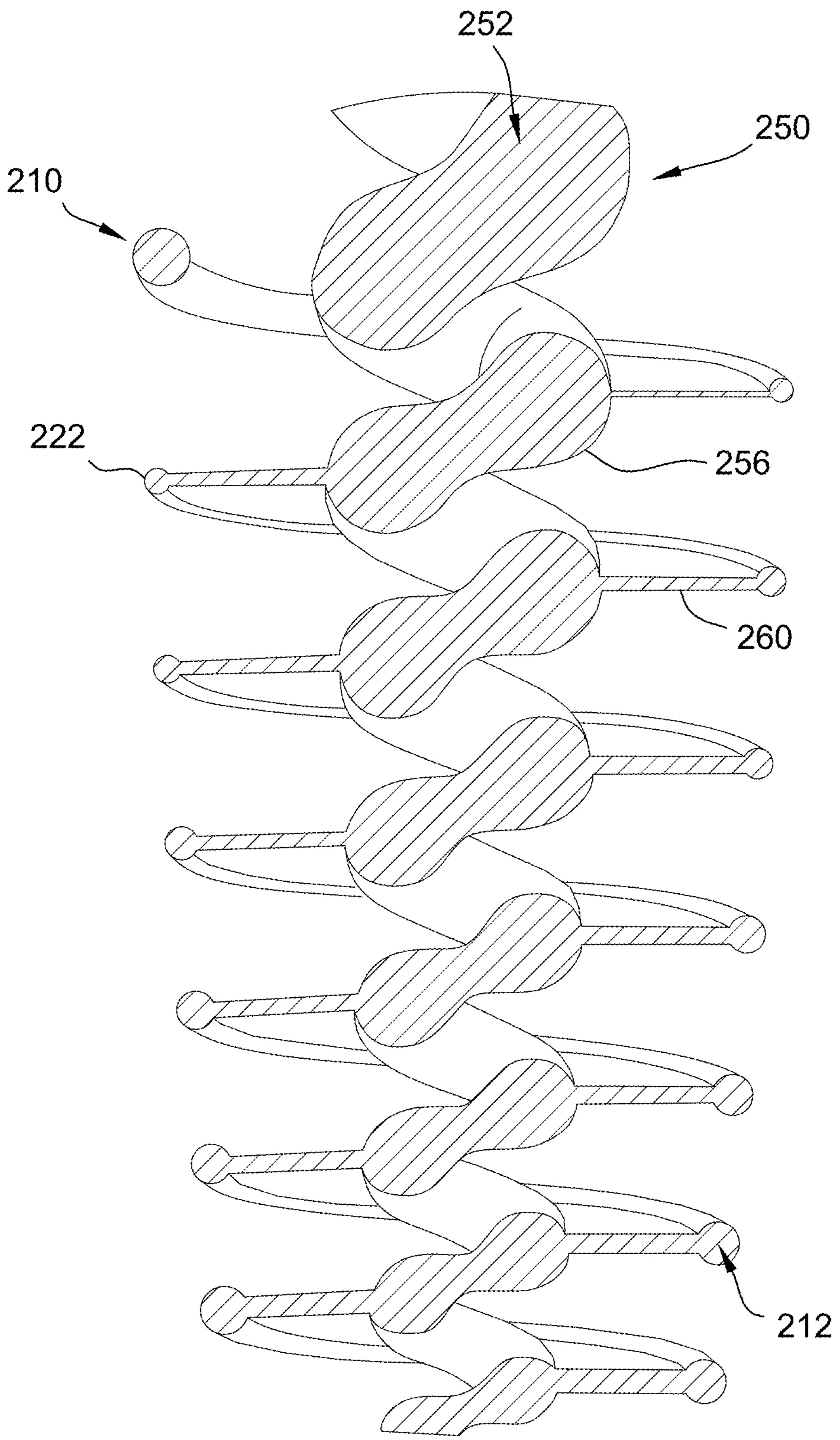
FIG. 12 is an enlarged view of the area of detail indicated in FIG. 11.

With reference to FIGS. 10-12, another embodiment of a vapor-liquid separator is illustrated and generally identified by reference numeral 200. The vapor-liquid separator 200 includes a housing 202 within which a first flow path 210 and a second flow path 250 are defined. Although generally illustrated as having a rectangular configuration, it is envisioned that the housing 202 may include any configuration and in embodiments, may include a configuration that is complementary to the configuration of the first flow path 210 and the second flow path 250 without departing from the scope of the disclosure. The first flow path 210 defines a first hollow interior portion 212 extending between a fluid inlet 214 extending through an outer surface 204 of the housing 202 and a fluid outlet 216 extending through the outer surface 204 of the housing 202. The first flow path 210 includes a converging inlet section 218 having an interior dimension that decreases in a direction extending away from the fluid inlet 214. In embodiments, the converging inlet section 218 defines a throat 220.

The fluid inlet 214 is fluidly coupled to the refrigeration loop 12 (FIGS. 1 and 2A) and receives fluid (e.g., saturated or at least partially sub-cooled liquid). The first flow path 210 includes a helical portion 222 fluidly coupled to the converging inlet section 218 at a downstream position of the converging inlet section 218, and in embodiments, downstream of the throat 220. As can be appreciated, the converging inlet section 218 and the helical portion 222 cause a reduction in static pressure and an increase in velocity of liquid refrigerant flowing through the first flow path 210 and generates vapor from the liquid refrigerant.

The helical portion 222 includes an inner dimension that increases in a direction extending towards the fluid outlet 216. In some embodiments, the helical portion 222 may include a diverging outlet section 224 having an inner dimension that increases in a direction extending towards the fluid outlet 216. As can be appreciated, the increasing inner dimension of the helical portion 222 and/or the diverging outlet section 224 causes a decrease in velocity and an increase in static pressure of liquid refrigerant flowing through the helical portion 222 and exiting the fluid outlet 216. Although generally illustrated as having a circular profile, it is envisioned that the first flow path 210 may include any profile, which may be the same or different along the length of the first flow path 210 without departing from the scope of the disclosure. It is contemplated that the helical portion 222 may include a variable pitch extending towards the fluid outlet 216. Although generally illustrated as having a pitch that increases in a direction extending towards the fluid outlet 216, it is envisioned that the helical portion 222 may include any pitch, which may be constant, decrease in a direction extending towards the fluid outlet 216, or may be variable without departing from the scope of the disclosure.

With continued reference to FIGS. 10-12, the second flow path 250 defines a second hollow interior portion 252 extending between and transferring vapor from the first hollow interior portion 212 of the first flow path 210 to a vapor outlet 254 extending through the outer surface 204 of the housing 202. In embodiments, the second hollow interior portion 252 may extend between and connect a vapor inlet 262 to the vapor outlet 254. The vapor inlet 262 is located downstream of the fluid inlet 214 and receives vapor separated from the liquid refrigerant flowing through the helical portion 222 of the first flow path 210. The second flow path 250 includes a helical portion 256 fluidly coupled to each of the vapor inlet 262 and the vapor outlet 254. The helical portion 256 of the second flow path 250 includes an inner dimension that increases in a direction extending towards the vapor outlet 254. As can be appreciated, the increasing inner dimension of the helical portion 256 causes a decrease in velocity and an increase in static pressure of the vapor flowing through the helical portion 256 and exiting the vapor outlet 254.

The vapor outlet 254 is fluidly coupled to the first vapor injection conduit 52*a* (FIGS. 1 and 2A) to channel vapor from the vapor outlet 254 of the vapor-liquid separator 200 to the vapor injection port 50 of the compressor 20. In the exemplary embodiment, the helical portion 222 of the first flow path 210 is disposed radially outward from the helical portion 256 of the second flow path 250, although it is envisioned that the first and second helical portions 222, 256 may be disposed in any relationship with respect to one another without departing from the scope of the disclosure. In one non-limiting embodiment, the helical portion 222 of the first flow path 210 is concentrically disposed about the helical portion 256 of the second flow path 250.

The vapor-liquid separator 200 includes one or more bridges 260 fluidly coupling the first hollow interior portion 212 to the second hollow interior portion 252 upstream of the vapor outlet 254 and along the helical portions 222, 256 of each of the first and second flow paths 210, 250. In embodiments, the one or more bridges 260 is a single continuous bridge between the helical portion 222 of the first flow path 210 and the helical portion 256 of the second flow path 250. In this manner, the increased velocity of the liquid refrigerant flowing through the helical portion 222 of the first flow path 210 causes vapor within the liquid refrigerant to flow into the second hollow interior portion 252 of the helical portion of the second flow path 250 via the one or more bridges 260. Although generally described as being a single continuous bridge, it is envisioned that the one or more bridges 260 may be non-contiguous or otherwise may be disposed in spaced relation to one another forming a plurality of discrete bridges.

The vapor-fluid separator 200 operates in a similar manner as the vapor-fluid separator 100, and therefore, operation of the vapor-fluid separator 200 will not be described in detail herein in the interest of brevity.

Figure 13:
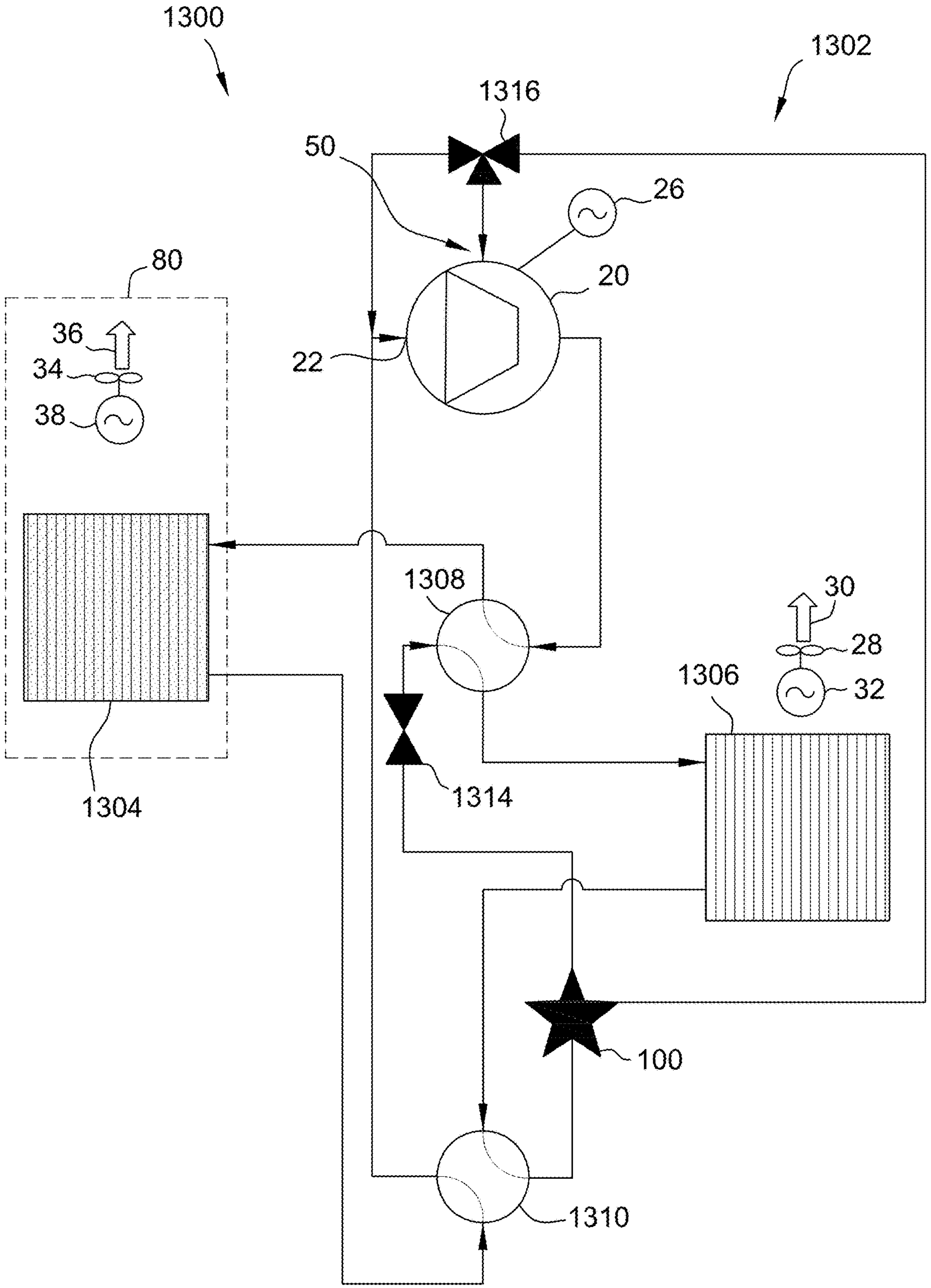
FIG. 13 is a schematic diagram of another embodiment of a vapor compression system in which the vapor-liquid separators of FIGS. 3-12 may be implemented.

With reference to FIG. 13, a schematic diagram of another embodiment of a vapor compression system utilizing the vapor-liquid separator 100, 200 is illustrated and generally identified by reference numeral 1300. The vapor compression system 1300 is substantially similar to the vapor compression system 10, and therefore, only the differences therebetween will be described in detail herein in the interest of brevity.

The vapor compression system 1300 is a single-stage compression system including a single, reversible, closed refrigerant loop 1302 having an indoor heat exchanger 1304, an outdoor heat exchanger 1306, a first multiway or reversing valve 1308, a second multiway or reversing valve 1310, the compressor 20, an expansion device 1314, a vapor-liquid separator 100, and a flow valve 1316. In other embodiments of the present disclosure, the vapor compression system 1300 may include multiple refrigerant loops to accommodate multiple compressors, or may operate in parallel with another system, such as a humidity control system. The flow valve 1316 is positionable between a first position permitting the flow of vapor from the vapor-liquid separator 100 to the compressor inlet 22 and a second position inhibiting the flow of vapor from the vapor-liquid separator 100 to the compressor inlet 22 while permitting the flow of refrigerant from the injection port 50 back to compressor inlet 22 to reduce a displacement of the compressor 20.

Figure 14:
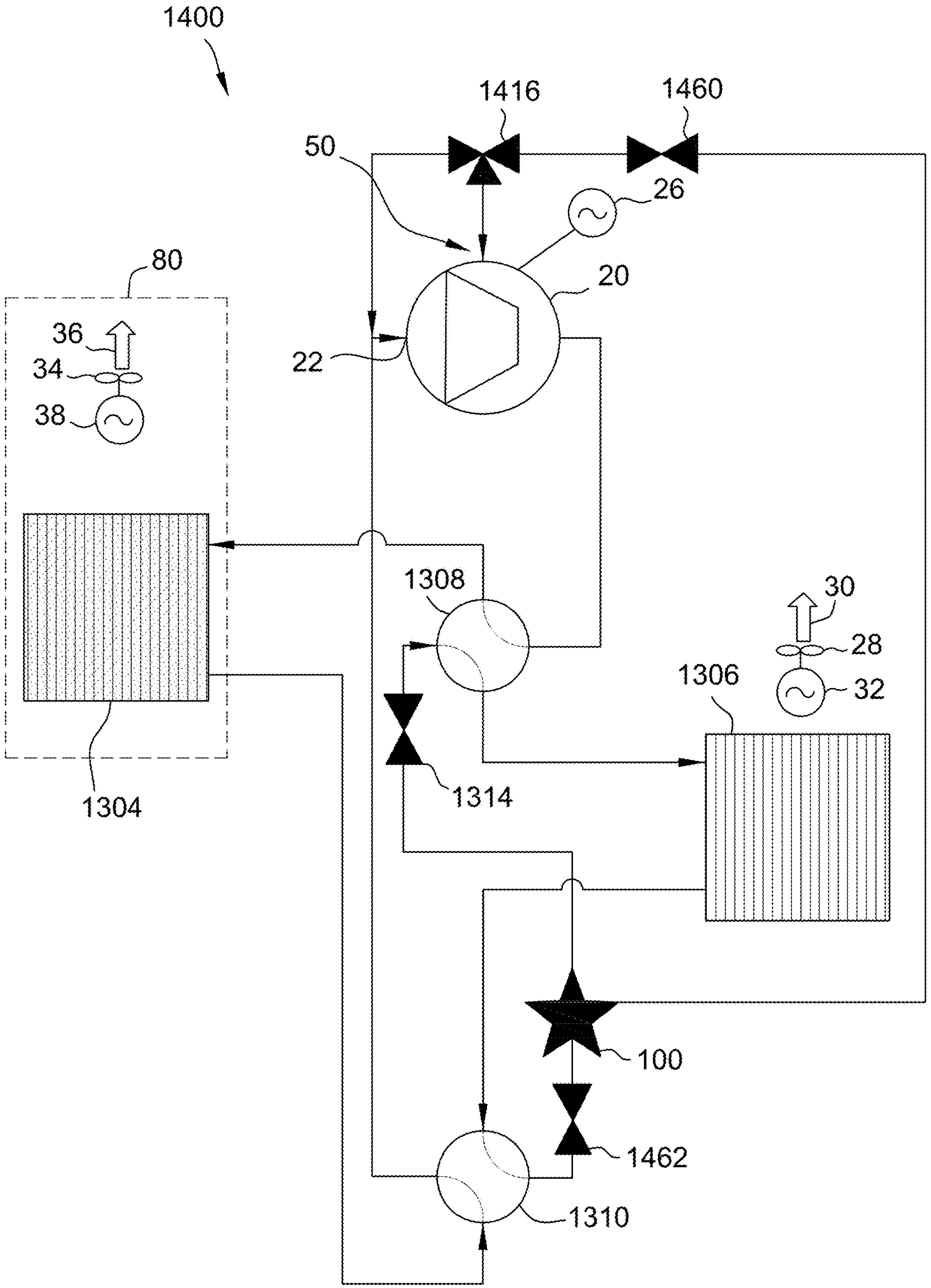
FIG. 14 is a schematic diagram of yet another embodiment of a vapor compression system in which the vapor-liquid separators of FIGS. 3-12 may be implemented.

With reference to FIG. 14, a schematic diagram of another embodiment of a vapor compression system utilizing the vapor-liquid separator 100, 200 is illustrated and generally identified by reference numeral 1400. The vapor compression system 1400 is substantially similar to the vapor compression systems 10 and 1400, and therefore, only the differences therebetween will be described in detail herein in the interest of brevity.

The vapor compression system 1400 is a multi-stage compression system and includes a shutoff valve 1460 interposed between the vapor-liquid separator 100 and the flow valve 1416 and an expansion valve 1462 disposed upstream of the vapor-liquid separator 100. The shutoff valve 1460 is positionable between a first position inhibiting the flow of vapor from the vapor-liquid separator 100 to the flow valve 1416, and therefore, the injection port 50, and a second position permitting the flow of vapor from the vapor-liquid separator 100 to the flow valve 1416, and therefore, the injection port 50.

Figure 15A:
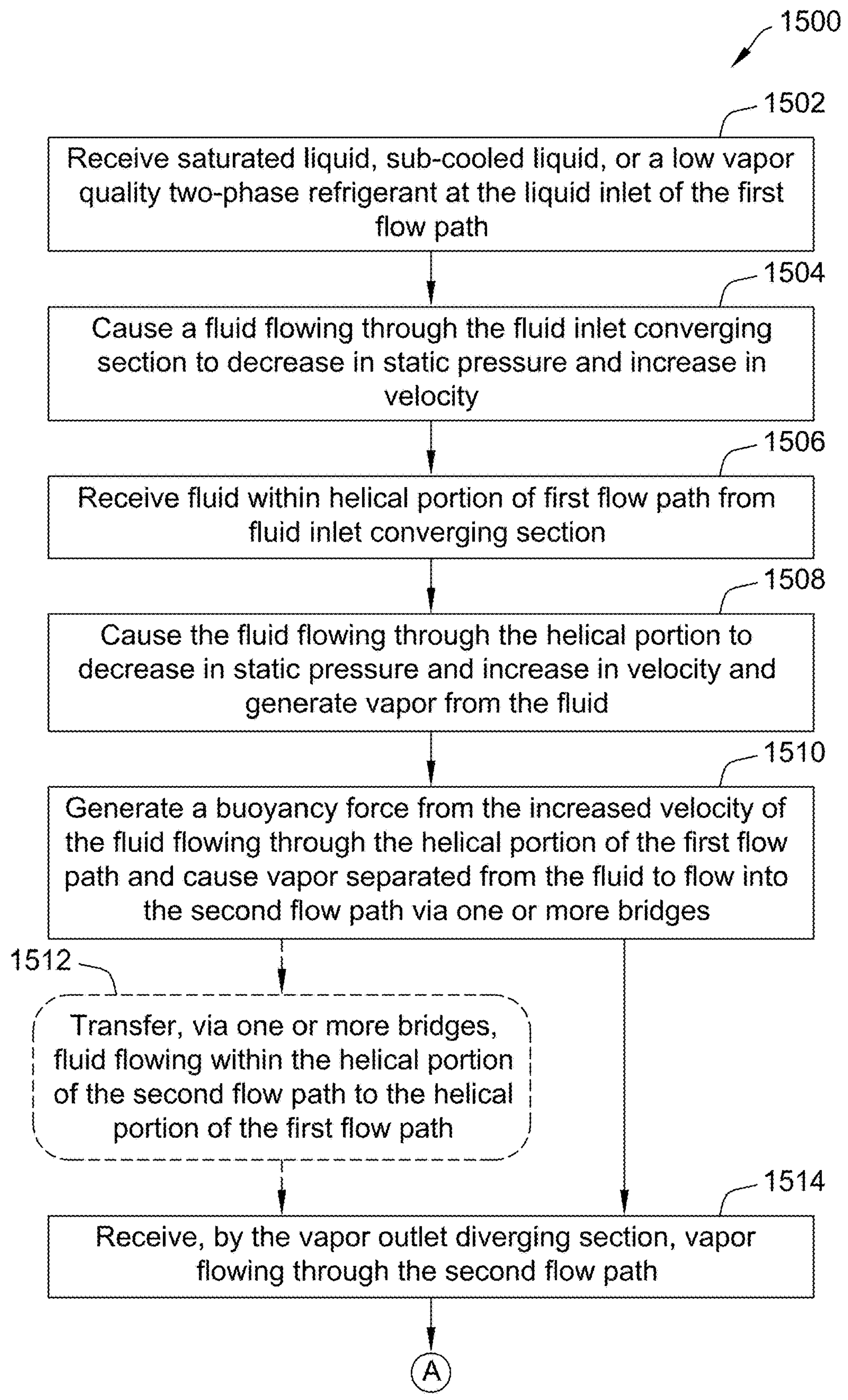
FIG. 15A is a flow diagram of an example method of operating a vapor-liquid separator in accordance with the disclosure.
Figure 15B:
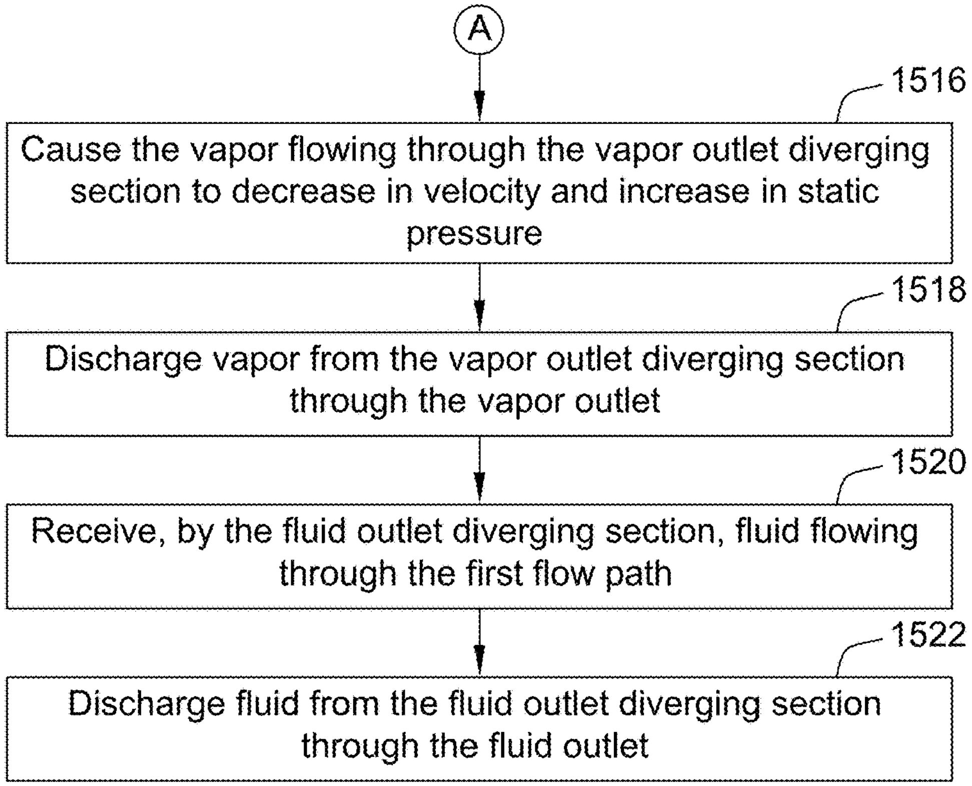
FIG. 15B is a continuation of the flow diagram of FIG. 15A.

Turning to FIGS. 15A and 15B, a method of operating a vapor-liquid separator is illustrated and generally identified by reference numeral 1500. The liquid inlet of the first flow path of the vapor-liquid separator receives 1502 saturated liquid, sub-cooled liquid, or a low vapor quality two-phase refrigerant. The fluid inlet converging section causes 1504 the fluid flowing through the fluid inlet converging section to decrease in static pressure and increase in velocity. The fluid flowing through the fluid inlet converging section is received 1506 by a helical portion of the first flow path, which causes 1508 the fluid flowing through the helical portion to decrease in static pressure and increase in velocity and generate vapor from the fluid. The increased velocity of the fluid flowing through the helical portion of the first flow path generates 1510 a buoyancy force, causing vapor separated from the fluid to flow into the second flow path via the one or more bridges. In embodiments, fluid flowing through the helical portion of the second flow path is transferred 1512 to the first helical portion of the first flow path via one or more fluid bridges. The vapor flowing through the second flow path is received 1514 by the vapor outlet diverging section, which causes 1516 the vapor to decrease in velocity and increase in static pressure and be discharged 1518 from the vapor outlet. The fluid flowing through the first flow path is received 1520 by the fluid outlet diverging section and is discharged 1522 from the fluid outlet.

It is envisioned that the working fluid may include at least one refrigerant that is suitable for use in a vapor compression cycle. Non-limiting examples of suitable refrigerants include natural refrigerants (e.g., carbon dioxide, water, ammonia, hydrocarbons, etc.), fluorocarbon-based refrigerants, and refrigerants that have a low global warming potential, such as ASHRAE classified A1 and A2L refrigerants. Non-limiting examples of A1 refrigerants include carbon dioxide (R-744), chlorodifluoromethane (R-22), 1,1-difluoroethane (R152a), 1,1,1,2-tetrafluoroethane (R134A), and R410A (a near-azeotropic mixture of difluoromethane (R-32) and pentafluoroethane (R-125)), and trifluoro monochloropropenes (R-1233 including cis- and trans-1-chloro-3,3,3-trifluoropropene (HFO-1233zd) isomers (HFO-1233zd(Z) and HFO-1233zd(E)), and hexafluorobutenes (HFO-1336, including HFO-1336mzz(Z), 1336mzz(E)). Non-limiting examples of A2L refrigerants include difluoromethane (R-32) and hydrofluorolefins (HFOs). Suitable HFO refrigerants are described, for example, in U.S. Pat. No. 4,788,352 to Smutny and U.S. Pat. No. 8,444,874 to Singh et al., the relevant portions of which are incorporated by reference. HFOs may include 2,3,3,3-tetrafluoroprop-1-ene (HFO-1234yf) and trans-1,3,3,3-tetrafluoroprop-1-ene (HFO-1234ze). Non-limiting suitable examples of specific HFO refrigerants include 3,3,3-trifluoropropene (HFO-1234zf), HFO-1234 refrigerants like 2,3,3,3-tetrafluoropropene (HFO-1234yf), 1,2,3,3-tetrafluoropropene (HFO-1234ze), cis- and trans-1,3,3,3-tetrafluoropropene (HFO-1234ye), pentafluoropropenes (HFO-1225) such as 1,1,3,3,3, pentafluoropropene (HFO-1225zc), hexafluorobutenes (HFO-1336), such as cis-1,1,1,4,4,4-hexafluoro-2-butene (HFO-1336mzz-Z) and trans-1,1,1,4,4,4-hexafluoro-2-butene (R1336mzz(E)), or those having a hydrogen on the terminal unsaturated carbon such as 1,2,3,3,3, pentafluoropropene (HFO-1225yez), fluorochloropropenes such as trifluoro, monochloropropenes (HFO-1233) like CF3CCl═CH2 (HFO-1233xf) and CF3CH═CHCl (HFO-1233zd) (including trans (E) and cis (Z) isomers (HFO-1233zd(E) and HFO-1233zd(Z)), (E)-1,2-difluoroethene (R-1132(E)), and any combinations thereof. In certain aspects, the HFO refrigerant may be selected from the group consisting of: R-1234yf, R-1234ze, R1233zd(E), R1233zd (Z), R1336mzz(Z), R1336mzz(E), R-1132(E), and combinations thereof. In some examples, these refrigerants are used in combination with other A1 or A2L refrigerants or yet other refrigerants, such or A3 or B1 or B2 refrigerants, including natural or flammable refrigerants (e.g., dimethyl ether (R-E170) or propane (C3H8 or R-290)).

The vapor compression system 10 in some examples operates using a working fluid that includes a refrigerant blend of at least two refrigerants. Suitable refrigerant blends and suitable climate control systems for use with such refrigerant blends are described, for example, in U.S. patent application Ser. No. 17/507,403 by Welch, et al., filed on October 2021, and published as U.S. Patent Application Publication No. 2023/0130167 on Apr. 27, 2023, the entire disclosure of which is hereby incorporated by reference herein. It is envisioned that features of the vapor compression system 10 can be used in any combination with the systems described in U.S. Patent Application Publication No. 2023/0130167, previously incorporated by reference herein. In certain examples, the refrigerant blend includes an A1 refrigerant, such as carbon dioxide (R-744), mixed with at least one other refrigerant. As can be appreciated, the carbon dioxide refrigerant is suitable for use in a sub-critical system design. One example of a suitable, non-limiting refrigerant blend includes $CO_2$ (R-744) as the more volatile, high-pressure refrigerant mixed with an HFO refrigerant (e.g., R-1233zd(E)) as the less volatile, low-pressure fluid. The refrigerant blend may be a "high glide" refrigerant blend that has a first refrigerant (e.g., $CO_2$) with a relatively lower normal boiling point (at 1 atmosphere (atm) of pressure)) and a second refrigerant with a relatively higher normal boiling point. A difference between normal boiling points of the first and second refrigerants is greater than or equal to 25° C. As a non-limiting example, where the refrigerant blend includes $CO_2$ having a normal boiling point of approximately 78° C. at 1 atm and R-1233zd(e) having a normal boiling point of approximately 18° C. at 1 atm, a different in boiling points is about 96° C.

Suitable working fluid refrigerant blends include a refrigerant selected from the group consisting of: R-744, R-22, R134A, R410A, R-1234yf, R-1234ze, R1233zd(E), R1233zd(Z), R1336mzz(Z), R1336mzz(E), and combinations thereof. Alternatively, a first refrigerant and a second refrigerant included in the refrigerant blend are independently selected from the group consisting of: R-744, R-22, R152a, R134A, R410A, R-E170, R-32, HFOs, R-290, R-601 (pentane), hexane, and combinations thereof. In some examples, the first refrigerant is selected from the group consisting of: R-744, R-22, R134A, R410A, R-E170, R-32, HFOs, and combinations thereof, and the second refrigerant is selected from the group consisting of: 2,3,3,3-tetrafluoroprop-1-ene (R1234yf), 1,3,3,3-tetrafluoroprop-1-ene (R-1234ze), 1-chloro-3,3,3-trifluoropropene (HFO-1233zd (E)), 1-chrloro-3,3,3-trifluoropropene (HFO-1233zd(Z)), 1,1,1,4,4,4-hexafluoro-2-butene (HFO-1336mzz), and combinations thereof.

The working fluid may include one or more refrigerants, such as those described hereinabove, in combination with a refrigeration lubricant oil. For example, the working fluid may include a synthetic oil. The lubricant oil may in some examples include a polyvinyl ether (PVE) oil, a polyalphaolefin (PAO), a polylkylene glycol (PAG), alkylbenzene, mineral oil, or an ester-based oil, such as polyol ester (POE) oil. POE oils may suitably be used where carbon dioxide (R-744) is present in the working fluid (e.g., in a refrigerant blend). Suitable POE oils may include a compound formed from a carboxylic acid and a polyol. Such POE compounds may be formed from a carboxylic acid selected from the group consisting of: n-pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid, and isononanoic acid, and combinations thereof and a polyol selected from a group consisting of: pentaerythritol, dipentaerythritol, neopentyl glycol, trimethylpropanol, and combinations thereof.

Technical benefits of the methods and systems described herein include increasing an efficiency of a reversible vapor compression system by incorporating a vapor-liquid separator utilizing two helical flow paths fluidly coupled by one or more bridges to generate and deliver more vapor to a compressor than a heat exchanger or a flash tank. The vapor-liquid separator may replace a flash tank and/or a heat exchanger used in a vapor economization loop, reducing complexity and costs of the vapor compressor system.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A vapor-liquid separator comprising:

a first flow path extending between a fluid inlet and a fluid outlet, wherein the first flow path defines a helical portion, wherein the helical portion causes a reduction in static pressure and an increase in velocity of a fluid flowing through the first flow path to generate vapor from the fluid;

a second flow path extending between and fluidly transferring vapor from the first flow path to a vapor outlet, wherein the second flow path defines a helical portion; and one or more bridges fluidly coupling the first flow path to the second flow path upstream of the vapor outlet and along the helical portion of each of the first flow path and the second flow path, wherein the increased velocity of the fluid flowing through the first flow path causes vapor within the first flow path to flow into the second flow path via the one or more bridges;

wherein vapor received within the second flow path is discharged from the vapor outlet, and the fluid flowing through the first flow path is discharged from the fluid outlet.

2. The vapor-liquid separator of claim 1, wherein the one or more bridges includes at least one vapor bridge including a vapor inlet fluidly coupled to the first flow path along a radial inner side of the helical portion of the first flow path, and a vapor outlet fluidly coupled to the second flow path along a radial outer side of the helical portion of the second flow path to allow vapor within the first flow path to flow into the second flow path.

3. The vapor-liquid separator of claim 1, wherein the one or more bridges includes at least one liquid bridge including a liquid inlet fluidly coupled to the second flow path from a region where liquid is collected of the helical portion of the second flow path, and a fluid outlet fluidly coupled to the first flow path along the helical portion of the first flow path to allow liquid within the second flow path to flow into the first flow path.

4. The vapor-liquid separator of claim 1, wherein the one or more bridges terminate at a position upstream of each of the vapor outlet and the fluid outlet, wherein the first and second flow paths include respective first and second diverging sections downstream of the position at which the one or more bridges terminate, wherein a cross-sectional area of the first diverging section increases as the first flow path extends toward the fluid outlet to produce an increase in static pressure of the fluid flowing through the first diverging section, wherein a cross-sectional area of the second diverging section increases as the second flow path extends towards the vapor outlet to produce an increase in static pressure of the vapor flowing through the second diverging section.

5. The vapor-liquid separator of claim 1, wherein the one or more bridges consist of a single continuous bridge between the first flow path and the second flow path, wherein the first flow path is disposed radially outward from the second flow path.

6. The vapor-liquid separator of claim 1, wherein the helical portion of the first flow path is intertwined with the helical portion of the second flow path.

7. The vapor-liquid separator of claim 6, wherein the one or more bridges includes discrete tubular bridge passages that extend between the first and second flow paths.

8. The vapor-liquid separator of claim 6, wherein one of the helical portion of the first flow path or the helical portion of the second flow path defines a non-circular cross-section.

9. The vapor-liquid separator of claim 1 further comprising a unitary body defining the first flow path, the second flow path, and the one or more bridges.

10. The vapor-liquid separator of claim 1 further comprising:

a first conduit defining the first flow path;

a second conduit defining the second flow path; and at least one third conduit defining the one or more bridges and fluidly coupling the first conduit to the second conduit.

11. A vapor-liquid separator comprising:

a first flow path including:

a fluid inlet section producing an increase in velocity and a decrease in static pressure of a fluid flowing through the fluid inlet section;

a fluid outlet section producing a decrease in velocity and an increase in static pressure of a fluid flowing through the fluid outlet section; and a first helical portion extending between and fluidly connecting the fluid inlet section to the fluid outlet section, the first helical portion producing an increase in velocity of the fluid flowing through the first helical portion and separation of a vapor from the fluid; and a second fluid flow path including:

a vapor outlet section defining a vapor outlet producing an increase in static pressure and a decrease in velocity of vapor flowing through the vapor outlet section;

a second helical portion extending between and fluidly transferring vapor from the first flow path to the vapor outlet section, the second helical portion intertwined with the first helical portion, wherein the increased velocity of the fluid flowing through the first helical portion causes vapor within the first helical portion to flow into the second helical portion; and one or more bridges fluidly coupling the first helical portion to the second helical portion, the one or more bridges permitting vapor within the first helical portion to flow into the second helical portion via the one or more bridges, wherein the vapor received within the second helical portion produces an increase in velocity of the vapor flowing through the second helical portion, wherein vapor received within the second helical portion is discharged from the vapor outlet and the fluid flowing through the first helical portion is discharged from the fluid outlet.

12. The vapor-liquid separator of claim 11, wherein the first helical portion transitions from, in a direction extending from the fluid inlet section to the fluid outlet section, a circular profile adjacent to the fluid inlet section, to a non-circular profile, and to a circular profile adjacent to the fluid outlet section.

13. The vapor-liquid separator of claim 12, wherein the second helical section transitions from, in a direction extending toward the vapor outlet section, a non-circular profile to a circular profile adjacent to the vapor outlet section.

14. The vapor-liquid separator of claim 11, wherein each bridge of the one or more bridges includes discrete tubular passages that extend between the first and second helical portions.

15. The vapor-liquid separator of claim 11, further comprising one or more second bridges fluidly coupling the second helical portion to the first helical portion upstream of each of the fluid outlet and the vapor outlet, the one or more second bridges allowing fluid flowing within the second helical portion to flow into the first helical portion.

16. A system comprising:

a fluid compression circuit comprising a compressor operable to compress a refrigerant; and a vapor-liquid separator fluidly connected to the fluid compression circuit to receive liquid refrigerant therefrom, the vapor-liquid separator comprising:

a first flow path extending between a fluid inlet and a fluid outlet, wherein the first flow path includes a helical portion causing a reduction in static pressure and an increase in velocity of the liquid refrigerant flowing through the first flow path to generate vapor from the liquid refrigerant;

a second flow path extending between and fluidly transferring vapor from the first flow path to a vapor outlet; and one or more bridges fluidly coupling the first flow path to the second flow path, wherein the increased velocity of the liquid refrigerant flowing through the first flow path causes vapor within the first flow path to flow into the second flow path via the one or more bridges, wherein vapor received within the second flow path is discharged from the vapor outlet to an intermediate compression stage of the compressor.

17. The system of claim 16, wherein the one or more bridges of the vapor-liquid separator terminate at a position upstream of each of the vapor outlet and the fluid outlet, wherein the first and second flow paths include respective first and second diverging sections downstream of the position at which the one or more bridges terminate.

18. The system of claim 16, wherein the first flow path is disposed radially outward from the second flow path.

19. The system of claim 16, wherein the helical portion of the first flow path is intertwined with the helical portion of the second flow path.

20. The system of claim 19, wherein the one or more bridges includes discrete tubular bridge passages that extend between the first and second flow paths.

* * * * *